US012549667B2

(12) United States Patent
Kwon et al.

(10) Patent No.: US 12,549,667 B2
(45) Date of Patent: Feb. 10, 2026

(54) ELECTRONIC DEVICE FOR TRANSMITTING AND RECEIVING MESSAGES WITH USER OF METAVERSE AND METHOD FOR OPERATING THE SAME

(71) Applicant: SAMSUNG ELECTRONICS CO., LTD., Suwon-si (KR)

(72) Inventors: Yongsuk Kwon, Suwon-si (KR); Youngjun Seo, Suwon-si (KR); Munhwan Choi, Suwon-si (KR); Sunmin Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 230 days.

(21) Appl. No.: 18/449,946

(22) Filed: Aug. 15, 2023

(65) Prior Publication Data

US 2024/0114091 A1  Apr. 4, 2024

Related U.S. Application Data

(63) Continuation of application No. PCT/KR2023/009719, filed on Jul. 10, 2023.

(30) Foreign Application Priority Data

Oct. 4, 2022  (KR) .................. 10-2022-0126439
Oct. 6, 2022  (KR) .................. 10-2022-0128172

(51) Int. Cl.
H04M 3/42  (2006.01)
(52) U.S. Cl.
CPC ................ *H04M 3/42068* (2013.01)
(58) Field of Classification Search
CPC .............................. H04M 3/42068
(Continued)

(56) References Cited

U.S. PATENT DOCUMENTS 7,970,837 B2  6/2011  Lyle et al.
9,342,211 B2  5/2016  DeLuca et al.
(Continued)

FOREIGN PATENT DOCUMENTS

CN  107908482 A  4/2018
CN  109126142 A  1/2019
(Continued)

OTHER PUBLICATIONS

Search Report dated Oct. 12, 2023 in International Patent Application No. PCT/KR2023/009719.
(Continued)

*Primary Examiner* — Binh Kien Tieu
(74) *Attorney, Agent, or Firm* — Nixon & Vanderhye, P.C.

(57) ABSTRACT

An example electronic device may include at least one processor and a communication device. The at least one processor may be configured to display an execution screen of a message application capable of accessing first reception information about a first receiver and second reception information about a second receiver; obtain a first command for transmitting a first message corresponding to the first receiver through the execution screen of the message application; transmit, through the communication device, the first message including, as reception information, a first phone number, based on the first reception information about the first receiver being the first phone number corresponding to the first receiver, in response to obtaining the first command; obtain a second command for transmitting a second message corresponding to the second receiver through the execution screen of the message application; and transmit, through the communication device, the second message including, as reception information, identification information about a metaverse service and user identification information, based (Continued)

on the second reception information about the second receiver being the identification information about the metaverse service and the user identification information defined in the metaverse service, in response to obtaining the second command.

22 Claims, 26 Drawing Sheets

(58) Field of Classification Search
 USPC .................................................. 379/142.04
 See application file for complete search history.

(56) References Cited

U.S. PATENT DOCUMENTS

| | | | |
|---|---|---|---|
| 10,469,419 B2 | 11/2019 | Seol et al. | |
| 10,963,648 B1 | 3/2021 | Bill | |
| 2007/0032267 A1* | 2/2007 | Haitani | H04M 1/27453 455/566 |
| 2008/0039074 A1* | 2/2008 | Sealey | H04M 7/003 455/426.2 |
| 2008/0259045 A1* | 10/2008 | Kim | G06F 3/04883 345/173 |
| 2013/0172026 A1* | 7/2013 | Odell | H04L 51/046 709/206 |
| 2015/0195223 A1 | 7/2015 | Appelman | |
| 2015/0245166 A1* | 8/2015 | Lee | H04W 4/80 455/41.2 |
| 2017/0323266 A1 | 11/2017 | Seo | |
| 2018/0011841 A1 | 1/2018 | Bill | |
| 2018/0337818 A1 | 11/2018 | Ban et al. | |
| 2022/0207116 A1 | 6/2022 | Ok | |
| 2024/0114062 A1* | 4/2024 | Kwon | H04L 65/1089 |

FOREIGN PATENT DOCUMENTS

| | | |
|---|---|---|
| CN | 111884914 A | 11/2020 |
| JP | 2010097465 A | 4/2010 |
| KR | 10-0729459 | 6/2007 |
| KR | 10-0836882 | 6/2008 |
| KR | 20110072438 A | 6/2011 |
| KR | 101540544 B1 | 7/2015 |
| KR | 10-2015-0124738 | 11/2015 |
| KR | 10-2018-0126839 | 11/2018 |
| KR | 102044008 B1 | 11/2019 |
| KR | 20210127054 A | 10/2021 |
| KR | 10-2021-0144459 | 11/2021 |
| KR | 20220075675 A | 6/2022 |
| WO | 2021/205240 | 10/2021 |

OTHER PUBLICATIONS

Written Opinion dated Oct. 12, 2023 in International Patent Application No. PCT/KR2023/009719.

* cited by examiner

ELECTRONIC DEVICE FOR TRANSMITTING AND RECEIVING MESSAGES WITH USER OF METAVERSE AND METHOD FOR OPERATING THE SAME

CROSS-REFERENCE TO RELATED APPLICATIONS

This application is a continuation of International Application No. PCT/KR2023/009719 designating the United States, filed on Jul. 10, 2023, in the Korean Intellectual Property Receiving Office and claiming priority to Korean Patent Application No. 10-2022-0126439, filed on Oct. 4, 2022, in the Korean Intellectual Property Office, and to Korean Patent Application No. 10-2022-0128172, filed on Oct. 6, 2022, in the Korean Intellectual Property Office, the disclosures of each of which are incorporated by reference herein in their entireties

BACKGROUND

Field

The disclosure relates to an electronic device for transmitting and receiving messages with a user of a metaverse.

Description of Related Art

Metaverse-related content is being actively provided. For example, metaverse-related content based on a virtual space, by which users can perform a designated activity in the virtual space through an avatar may be provided. For example, additional information about the actual environment or metaverse-related content based on an augmented reality that allows other objects to appear overlapped on the actual environment may be provided. As the metaverse-related content becomes more advanced, a number of users may access the metaverse service.

The users accessing the metaverse service may conduct a conversation based on chatting or voice chatting provided in the metaverse service or, as the avatars of a plurality of users are located in the virtual space, they may conduct a conversation in an environment, such as video chatting.

Multiple users who use a metaverse service may experience a virtual world while anonymity being guaranteed without exposing their private information, such as name, age, or gender, by using their avatars created to their tastes. Communication between users in a virtual world is performed via a chatting window or a voice conversation service provided by the metaverse. Users may communicate with many people in a common virtual space for common interests while anonymity being guaranteed. In the real world, calling or messaging on a mobile phone in the real world requires sharing of phone numbers, which corresponds to personal information. In the real world, IMS and RCS may be used as a service for communication on a mobile device. A phone or message service may be provided in connection with a mobile communication operator's communication network that provides phone numbers to users in the real world using a server application for Internet-based voice or message transmission and/reception.

SUMMARY

According to an example embodiment, an electronic device may include at least one processor and a communication device. The at least one processor may be configured to display an execution screen of a message application capable of accessing first reception information about a first receiver and second reception information about a second receiver; obtain a first command for transmitting a first message corresponding to the first receiver through the execution screen of the message application; transmit, through the communication device, the first message including, as reception information, a first phone number, based on the first reception information about the first receiver being the first phone number corresponding to the first receiver, in response to obtaining the first command; obtain a second command for transmitting a second message corresponding to the second receiver through the execution screen of the message application; and transmit, through the communication device, the second message including, as reception information, identification information about a metaverse service and user identification information, based on the second reception information about the second receiver being the identification information about the metaverse service and the user identification information defined in the metaverse service, in response to obtaining the second command.

According to an example embodiment, a method for operating an electronic device may include displaying an execution screen of a message application capable of accessing first reception information about a first receiver and second reception information about a second receiver; obtaining a first command for transmitting a first message corresponding to the first receiver through the execution screen of the message application; transmitting the first message including, as reception information, a first phone number, based on the first reception information about the first receiver being the first phone number corresponding to the first receiver, in response to obtaining the first command; obtaining a second command for transmitting a second message corresponding to the second receiver through the execution screen of the message application; and transmitting the second message including, as reception information, identification information about a metaverse service and user identification information, based on the second reception information about the second receiver being the identification information about the metaverse service and the user identification information defined in the metaverse service, in response to obtaining the second command.

According to an example embodiment, a non-transitory storage medium may store instructions that, when executed by at least one processor, enable an electronic device to perform at least one operation including obtaining a first command for transmitting a first message corresponding to the first receiver through the execution screen of the message application; transmitting the first message including, as reception information, a first phone number, based on the first reception information about the first receiver being the first phone number corresponding to the first receiver, in response to obtaining the first command; obtaining a second command for transmitting a second message corresponding to the second receiver through the execution screen of the message application; and transmitting the second message including, as reception information, identification information about a metaverse service and user identification information, based on the second reception information about the second receiver being the identification information about the metaverse service and the user identification information defined in the metaverse service, in response to obtaining the second command.

According to an example embodiment, an electronic device may include at least one processor and a communication device. The at least one processor may be configured to identify a call generation request for first user identification information defined in a first metaverse service; transmit, through the communication device, a first message for call generation, including identification information about the first metaverse service and the first user identification information; receive, through the communication device, a second message corresponding to the first message from a first server corresponding to the first metaverse service; receive, through the communication device, data for representing a voice call associated with the first user identification information using a call session established based on transmission of the first message and reception of the second message; and provide content representing the voice call using the received data.

According to an example embodiment, a method for operating an electronic device may include identifying a call generation request for first user identification information defined in a first metaverse service; transmitting a first message for call generation, including identification information about the first metaverse service and the first user identification information; receiving a second message corresponding to the first message from a first server corresponding to the first metaverse service; receiving data for representing a voice call associated with the first user identification information using a call session established based on transmission of the first message and reception of the second message; and providing content representing the voice call using the received data.

According to an example embodiment, a non-transitory storage medium may store instructions that, when executed by at least one processor, enable an electronic device to perform at least one operation including identifying a call generation request for first user identification information defined in a first metaverse service; transmitting a first message for call generation, including identification information about the first metaverse service and the first user identification information; receiving a second message corresponding to the first message from a first server corresponding to the first metaverse service; receiving data for representing a voice call associated with the first user identification information using a call session established based on transmission of the first message and reception of the second message; and providing content representing the voice call using the received data.

BRIEF DESCRIPTION OF THE DRAWINGS

The above and other aspects, features, and advantages of certain embodiments of the present disclosure will be more apparent from the following detailed description, taken in conjunction with the accompanying drawings in which like reference numerals refer to like elements, in which.

DETAILED DESCRIPTION

Figure 1:
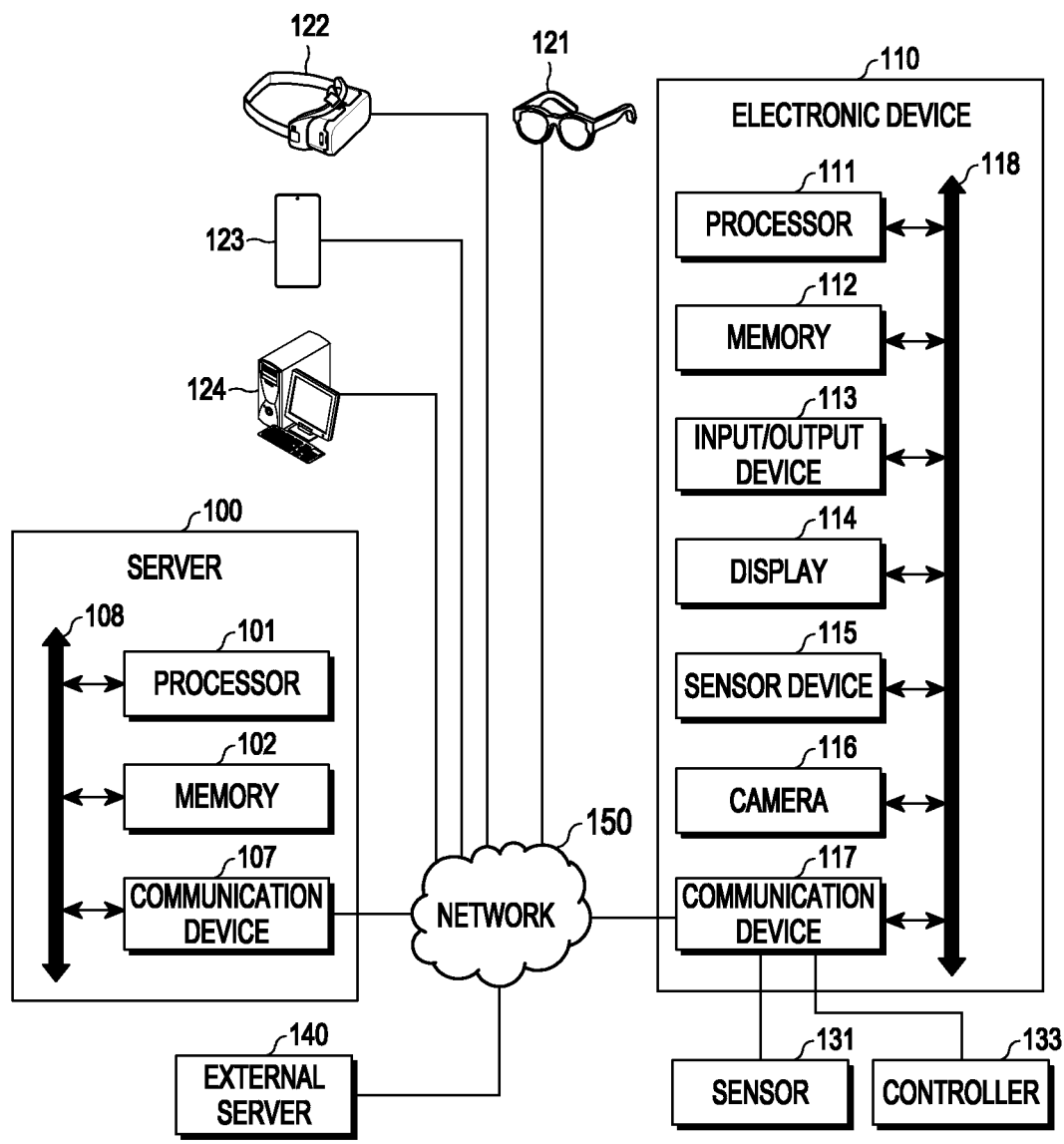
FIG. 1 is a view illustrating an example artificial reality providing system according to an embodiment.

FIG. 1 is a view illustrating an example artificial reality providing system according to an embodiment.

According to an embodiment, an artificial reality providing system may include at least one of a server 100, an electronic device 110, at least one external electronic device 121, 122, 123, and 124, or an external server 140.

According to an embodiment of the disclosure, the server 100 may generate data for representing artificial reality (e.g., at least one of an augmented reality environment or a virtual reality environment). In addition to augmented reality or virtual reality, the server 100 may provide content capable of enhancing user immersion, and such content may be referred to as content for a metaverse. The server 100 may include a processor 101, a memory 102, and/or a communication device 107 (including, e.g., a communication circuit). Meanwhile, it is merely by way of example that the server 100 includes the processor 101, the memory 102, and/or the communication device 107, and at least some of the operations of the server 100 may be implemented by a cloud server. It will be understood by one of ordinary skill in the art that the server 100 may be implemented as a distributed server, and the implementation form of the server is not limited.

According to an embodiment, the processor 101 may execute commands (or instructions) included in a program (or application) stored in the memory 102. The processor 101 may include, e.g., a central processing unit (CPU), a graphic processing unit (GPU), a neural processing unit (NPU), a sensor processing unit (TPU), a digital signal processor (DSP), an application-specific integrated circuit (ASIC), a field programmable gate array (FPGA), and/or a programmable logic device, but is not limited thereto provided that the processor 101 is capable of executing a program (or instructions or commands). The processor 101 may execute a program for artificial reality and other programs (or instructions or commands). The program for artificial reality may be stored in the memory 102. According to an embodiment, the memory 102 may include a volatile memory and/or a non-volatile memory, and may include, e.g., a hard disk storage device, RAM, ROM, and/or flash memory, but the disclosure is not limited thereto. The program for artificial reality is a program for a server, and may cause, e.g., generation of data for representing artificial reality, provision of the generated data, identification of a user input, and/or generation and provision of data for representing updated artificial reality based on the identified user input, and may include commands (or instructions) corresponding to at least some of operations performed by the server 100. The communication device 107 may support establishing a communication channel between the server 100 and the electronic device 110 through the network 150 and performing communication through the established communication channel. The communication device 107 may, for example, be a device capable of providing a wide area network (e.g., the Internet), but is not limited thereto. The operation performed by the server 100 may be performed by, e.g., the processor 101, or may be performed by other hardware under the control of the processor 101. A command (or instruction) causing the server 100 to perform an operation may be stored in the memory 102. The processor 101, the memory 102, and/or the communication device 107 may transmit/receive data via the bus 108 (or a communication interface or a network) of the server 100.

According to an embodiment, the electronic device 110 may perform at least one operation (e.g., including, but not limited to, providing visual content (e.g., an image), providing auditory content (e.g., a voice), providing tactile content (e.g., vibration), and/or providing olfactory content (e.g., smell)) for representing artificial reality using data for representing artificial reality. The user who owns or wears the electronic device 110 may experience artificial reality based on content provided from the electronic device 110. The electronic device 110 may include at least one of a processor 111, a memory 112, an input/output device 113, a display 114, a sensor device 115, a camera 116, or a communication device 117. The processor 111 may include, e.g., a CPU, a GPU, an NPU, a TPU, a DSP, an ASIC, an FPGA, and/or a programmable logic device, but is not limited thereto provided the processor is capable of executing a program (or instructions or commands). For example, the processor 111 may execute a program for artificial reality. The program for artificial reality is a program for a client, and may cause, e.g., reception of data for representing artificial reality from the server 100, provision of at least one operation (e.g., provision of visual content (e.g., image), provision of auditory content (e.g., voice), provision of tactile content (e.g., vibration), and/or provision of olfactory content (e.g., smell), but is not limited thereto) for representing artificial reality based on the received data, identification of a user input, and/or transmission of a user input (or a command corresponding to the user input) to the server 100. The program for artificial reality may include commands (or instructions) corresponding to at least some operations performed by the electronic device 110 of the disclosure. According to an embodiment, the memory 112 may include a volatile memory and/or a non-volatile memory, and may include, e.g., a hard disk storage device, RAM, ROM, and/or flash memory, but is not limited thereto. According to an embodiment, the input/output device 113 may include a touch pad, a button, a mouse, a digital pen, and/or a microphone, but is not limited thereto provided it is a device for receiving (or sensing) a user input. For example, the touch screen panel, which is one example of the input/output device 113, may be implemented integrally with the display 114. The input/output device 113 may include a speaker, a haptic module, and/or a light emitting module, but is not limited thereto provided it is a device for outputting content related to artificial reality. According to an embodiment, the sensor device 115 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor. According to an embodiment, the camera 116 may include one or more lenses, image sensors, image signal processors, or flashes. According to an embodiment, the communication device 117 (including, e.g., a communication circuit) may support establishing a communication channel between the server 100 and the electronic device 110 through the network 150 and performing communication through the established communication channel. The communication device 117 may be a device capable of providing a wide area network (e.g., the Internet), but is not limited thereto. The communication device 117 may support wired communication and/or wireless communication. For example, the communication device 117 may support short-range communication (e.g., short-range communication such as Bluetooth, wireless fidelity (Wi-Fi) direct, or infrared data association (IrDA)). The communication device 117 may transmit and receive data to and from the external sensor 131 and/or the external controller 133 based on short-range communication. For example, when the electronic device 110 is implemented as a standalone type, the communication device 117 may support a function of wirelessly accessing the network 150. The communication device 117 may support cellular communication such as LTE, 5G, or 6G, and/or IEEE 802 series-based communication (e.g., may be referred to as Wi-Fi). The communication device 117 may be implemented to support wired communication, and the implementation method thereof is not limited. When the electronic device 110 is implemented as a non-standalone type, the electronic device 110 may communicate with the server 100 through a relay device connectable to the network 150. In this case, the communication device 117 may support short-range communication such as Bluetooth, wireless fidelity (Wi-Fi) direct, or infrared data association (IrDA), and may perform communication with the server 100 through the relay device using the short-range communication. The external sensor 131 may include a gesture sensor, a gyro sensor, an atmospheric pressure sensor, a magnetic sensor, an acceleration sensor, a grip sensor, a proximity sensor, a color sensor, an IR sensor, a biometric sensor, a temperature sensor, a humidity sensor, and/or an illuminance sensor. Operations performed by the electronic device 110 may be performed by, e.g., the processor 111, or may be performed by other hardware devices under the control of the processor 111. A command (or instruction) causing the electronic device 110 to perform an operation may be stored in the memory 112. The processor 111, the memory 112, the input/output device 113, the display 114, the sensor device 115, the camera 116, and/or the communication device 117 may transmit/receive data through the bus 118 (or a communication interface or a network) of the electronic device 110. Meanwhile, it is merely by way of example that the server 100 and the electronic device 110 transmit and receive data based on an application for artificial reality, and those skilled in the art will understand that the server 100 and the electronic device 110 may transmit and receive other data including at least some data based on the web.

According to an embodiment, the external sensor 131 may be, e.g., a ring-type device, a bracelet-type device, or a head-attached device, but is not limited to the type and/or the attached body part of the user. The external sensor 131 may provide data sensed based on short-range communication to the electronic device 110. The controller 133 may include, e.g., a touch pad, a button, a mouse, a digital pen, and/or a microphone, but is not limited thereto provided it is a device for receiving (or sensing) a user input. The controller 133 may provide data obtained based on short-range communication to the electronic device 110. In an embodiment, the controller 133 may further include at least one sensor in addition to a device for receiving a user input. In this case, the controller 133 may provide data and/or sensing data associated with the user input to the electronic device 110 based on short-range communication.

According to an embodiment, the server 100 may transmit and receive data to and from the at least one external electronic device 121, 122, 123, and 124. The server 100 may transmit, to the electronic device 110, data for representing artificial reality updated and/or changed based on the data from the at least one external electronic device 121, 122, 123, or 124. The electronic device 110 may perform at least one operation for representing artificial reality based on data. Accordingly, when there are a plurality of users in one artificial reality, an artificial reality reflecting an operation by one user may be provided to another user.

According to an embodiment, the external server 140 may transmit and receive data to and from the server 100 through the network 150. The external sensor 131 may be, e.g., a server supporting the same application (or the same artificial reality) as the server 100. Alternatively, the external server 140 may be a server that supports an application (or different artificial reality) different from the server 100. In this case, the server 100 may convert data of the external server 140 into a format of an application (or artificial reality) supported by the server 100. The server 100 may transmit data for representing artificial reality reflecting the converted data to the electronic device 110. As described above, the server 100 may interact with an artificial reality different from the supported artificial reality, and such a function may be referred to as a multiverse function.

<Embodiment for Virtual Reality>

According to an embodiment of the disclosure, the electronic device 110 may be a head-mounted device (HMD) supporting virtual reality or a smartphone connectable to a structure that may be fixed to the head. The user may observe each of a left-eye image and a right-eye image for representing the virtual reality displayed on the display 114 with both eyes while wearing the HMD on the head or wearing a structure connected with a smartphone. Alternatively, the user may observe an image for representing virtual reality displayed on the display 114 of the electronic device 110 without wearing the electronic device 110 on the head. In this case, the electronic device 110 may be implemented as a smartphone, a tablet, a general-purpose computer, or a smart mirror, but is not limited thereto.

According to an embodiment of the disclosure, the server 100 may generate data for representing at least one space (or a scene gazing at the corresponding space) of the VR. For example, the server 100 may receive information about a first user (e.g., account information about the first user and/or information for authentication) from the electronic device 110. The server 100 may perform a log-in procedure of the first user based on the information about the first user. The server 100 may identify a space corresponding to the first user in the virtual reality. For example, the server 100 may identify a space privately allocated to the first user. For example, the server 100 may identify a space corresponding to a location of the first user in an open space. For example, the server 100 may identify the space corresponding to a user input. The method in which the server 100 identifies the space corresponding to the location of the first user is not limited. For example, at least one object and/or an avatar (or character) corresponding to the user may be included in the identified space. When a viewpoint of a scene is a first-person viewpoint, the data for representation may be related to a scene in which the identified space is viewed from the user's viewpoint. In some cases, the scene looking at the identified space may not include an avatar (or a character) corresponding to the first user, or may include only a part (e.g., a hand, etc.) of the body, but is not limited thereto, or may include the back of the avatar. When the viewpoint of the scene is a third person viewpoint, the data for representation may be related to the scene in which the space including the avatar (or character) corresponding to the user is viewed in one direction.

According to an embodiment, a scene viewed from the user's viewpoint may include an avatar corresponding to another user. For example, a second user may access the server 100 using the external electronic device 122. The server 100 may generate data for representing artificial reality used together by the first user and the second user. For example, when both the first user and the second user are present in a specific space, the server 100 may generate data for representing an artificial reality used together by the first user and the second user. For example, when the viewpoint of the scene is the first person viewpoint, the scene for the first user may include at least a portion of the avatar of the second user. For example, when the viewpoint of the scene is a third-person viewpoint, the scene for the first user may include at least a portion of a first avatar (or character) corresponding to the first user and/or at least a portion of a second avatar (or character) corresponding to the second user. In an embodiment, at least a portion of a screen displayed on the electronic device 110 may be provided to the server 100. At least a portion (or an object corresponding to at least a portion) of the screen displayed on the electronic device 110 may be disposed in the virtual reality space.

According to an embodiment, the server 100 may receive a user input and/or a command corresponding to the user input from the electronic device 110. For example, the electronic device 110 may identify a user input through the input/output device 113. For example, the electronic device 110 may identify a user input through the built-in sensor device 115. For example, the electronic device 110 may obtain a user input from the external sensor 131 and/or the controller 133 connected through the communication device 117. The processor 111 may identify motion information about the electronic device 110 as a user input, based on sensing data identified through the sensor device 115. For example, the electronic device 110 may obtain a user input from the external sensor 131 and/or the controller 133 connected through the communication device 117.

According to an embodiment, the electronic device 110 may identify a command based on a user input. The command may include, e.g., moving in virtual reality, designating an object in virtual reality, manipulating an object in virtual reality, and/or interacting with another avatar, but is not limited thereto. The electronic device 110 may transmit a command to the server 100. For example, the electronic device 110 may transmit the user input to the server 100 without identifying the command based on the user input, and, in this case, the server 100 may identify the command based on the user input.

According to an embodiment of the disclosure, the server 100 may update the virtual reality space or change the virtual reality space to another space based on a command. For example, when the command is the designation of the object, the space may be updated to reflect a function connected to the designated object. For example, when the command is the manipulation of the object, the space may be updated to change a position of the corresponding object. For example, when the command is to perform an operation of the avatar, the space may be updated so that the avatar of the user performs a corresponding reaction. For example, when the command is an interaction with another avatar, the space may be updated so that the corresponding avatar performs a corresponding reaction. For example, when the command is to move, the space for displaying may be changed to another space. It will be understood by one of ordinary skill in the art that there is no limitation to spatial updates and/or changes in a command-based virtual reality. In addition to updating and/or changing visual content, the server 100 may provide auditory content, tactile content, and/or olfactory content. The server 100 may relay voice data and/or text for chatting between users. For example, the server 100 may update and/or change a space using association information between a command and an update and/or change. For example, the server 100 may store an artificial intelligence model that receives a user input and/or a command as an input value and outputs an update and/or change of a space as an output value. The server 100 may update and/or change the space based on the output value of the artificial intelligence model. For example, the server 100 may store an artificial intelligence model that provides an update and/or change of a space based on a context of the corresponding space without a user input. The server 100 may update and/or change the space based on the context of the corresponding space using the artificial intelligence model.

According to an embodiment, the server 100 may transmit data for representing the updated space and/or data for representing the changed space to the electronic device 110. The server 100 may transmit data for representing the update space and/or data for representing the changed space to the external electronic device 122 corresponding to the second user. Accordingly, in the external electronic device 122, a virtual reality reflecting a space updated by the first user of the electronic device 110 may be represented. Further, based on information (e.g., a user input and/or a command) transmitted from the external electronic device 122 to the server 100, the server 100 may update a space used (or present) by both the first user and the second user. The server 100 may transmit data for representing the updated space to the electronic device 110. The electronic device 110 may represent the updated space based on the received data. As described above, the server 100 may share the updated space corresponding to any one user with an electronic device of another user corresponding to the corresponding space. For example, time-series space update and/or change may be referred to as a user experience. The server 100 and/or the electronic device 110 may store at least one piece of data associated with the user experience in the memory 102 and/or 112. For example, the server 100 may store at least one piece of data associated with the user experience for each user (e.g., for each user account). For example, the server 100 and/or the electronic device 110 may store data for representing a viewpoint during a user experience in the memory 102 and/or 112. For convenience of description, this may be represented as capturing a user experience. The server 100 may store data associated with the user experience, which may be referred to as life logging. The server 100 may additionally store data associated with the user. For example, the server 100 may receive at least one piece of sensing data from the electronic device 110, store the at least one piece of sensing data in time series, or update a final value. The server 100 may generate a user (e.g., avatar) in virtual reality corresponding to the user of the real world based on at least one piece of sensing data, and may be referred to as a digital twin.

<Embodiment for Augmented Reality>

According to an embodiment of the disclosure, the electronic device 110 may provide content for augmented reality that represents at least one visual object that may be superimposed on an actual environment viewed by a specific user. Meanwhile, those skilled in the art will understand that at least some of the operations of the server 100 and/or the electronic device 110 described in the embodiment of the virtual reality may be performed by the server 100 and/or the electronic device 110 described in an embodiment of the augmented reality, and vice versa. According to an embodiment of the disclosure, the electronic device 110 may be a glasses-type electronic device supporting augmented reality, a smart lens, or a smartphone capable of displaying a captured image in real time. The user may observe a visual object displayed on a transparent display (or a semi-transparent display) of the glasses-type electronic device or the smart lens together with an actual environment while wearing the glasses-type electronic device or the smart lens. Alternatively, the user may observe an image captured by the smartphone and a visual object displayed to overlap the image.

According to an embodiment, the electronic device 110 may obtain a foreground image through the camera 116 (e.g., a camera facing forward). The electronic device 110 may transmit the foreground image, a portion of the foreground image, or 3D modeling data obtained based on the foreground image to the server 100 through the communication device 117. The electronic device 110 may identify the orientation of the electronic device 110 based on the captured image and/or sensing data by the sensor device 115. The electronic device 110 may transmit data on the orientation of the electronic device 110 through the communication device 117. The electronic device 110 may obtain a captured image of the user's eyes using the camera 116 (e.g., a camera facing backward). The electronic device 110 may identify the user's gaze based on the captured image of the eye. The electronic device 110 may transmit data on the user's gaze through the communication device 117.

According to an embodiment of the disclosure, the server 100 may generate data for representing at least one visual object that may be superimposed on an actual environment viewed by a specific user, as data for representing artificial reality. The server 100 may analyze data (e.g., data associated with a foreground image, an orientation of the electronic device 110, and/or a user's gaze) received from the electronic device 110, and identify at least one visual object based on the analysis result. The server 100 may transmit data for representing at least one visual object to the electronic device 110 through the communication device 107. At least one visual object may be displayed, e.g., by the display 114 of the electronic device 110, and the user may observe at least one visual object overlapping on the actual environment. For example, the visual object may have information and/or a shape associated with an object disposed in an actual environment. In this case, the electronic device 110 may display the visual object so that the visual object may be observed by the user as if the visual object is located near the object disposed in the actual environment.

According to an embodiment, the electronic device 110 may identify a user input. For example, the user input may be identified through the input/output device 113 included in the electronic device 110 and/or through the external sensor 131 and/or the controller 133. The user input may cause, e.g., designation and/or manipulation of a displayed visual object. The electronic device 110 may transmit a user input and/or a command corresponding to the user input to the server 100. The server 100 may generate data for representing artificial reality based on a user input and/or a command corresponding to the user input. For example, the server 100 may identify that the user input is based on the designation and/or manipulation of the visual object, and accordingly provide deformation of the visual object, movement of the visual object, and/or provision of another visual object corresponding to the function of the visual object, but the performed operations are not limited. The server 100 may transmit data for representing artificial reality generated based on a user input and/or a command corresponding to the user input to the electronic device 110. The electronic device 110 may provide content associated with artificial reality based on data for representing artificial reality. As described above, the server 100 and/or the electronic device 110 may provide a function that allows the user to interact with the visual object.

In an embodiment, the server 100 may generate an avatar (or character) corresponding to another user as data for representing artificial reality. The server 100 may transmit an avatar (or a character) corresponding to another user to the electronic device 110. The electronic device 110 may display an avatar (or a character) corresponding to another user using the received data for representing artificial reality. Accordingly, the user may observe an avatar (or character) corresponding to another user overlapping on the actual environment. Accordingly, the user may experience an avatar (or character) corresponding to another user as if the avatar (or character) is located in an actual environment. The avatar (or character) corresponding to another user may be manipulated by, e.g., a user input obtained from the external electronic device 121, 122, 123, or 124, and/or may be manipulated based on an artificial intelligence model stored in the server 110, and the manipulation method of the avatar (or character) is not limited. Based on the avatar (or character) being manipulated, the server 100 may transmit data for representing the manipulated avatar (or character) to the electronic device 110. The electronic device 110 may represent the avatar (or character) manipulated based on the received data, and accordingly, the user may experience the avatar (or character) corresponding to another user as if the avatar (or character) operates in the actual environment. As described above, the server 100 and/or the electronic device 110 may store a user experience associated with augmented reality in the memory 102 and/or 112. For example, the server 100 may store, for each user (e.g., for each user account), at least one piece of data associated with a user experience associated with augmented reality. For example, the server 100 and/or the electronic device 110 may store, in the memory 102 and/or 112, data for representing a viewpoint among user experiences associated with augmented reality.

Meanwhile, it is by way of example without limitation that the server 100 and the electronic device 110 generate data for representing artificial reality and represent the data. According to an embodiment, the electronic device 110 may generate data for representing artificial reality and/or generate data for artificial reality based on data from the external electronic device 121, 122, 123, and 124. In this case, the electronic device 110 may generate data for representing artificial reality without data from the server 100.

Figure 2A:
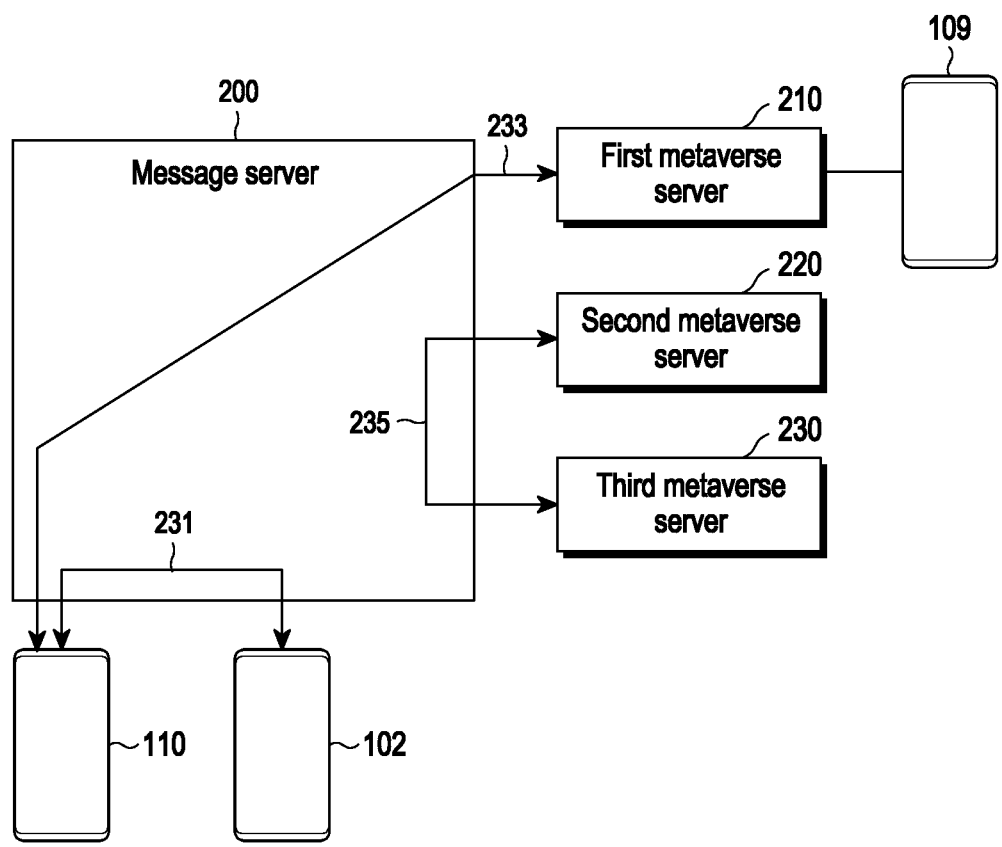
FIG. 2A is a view illustrating example message transmission and reception between a user in a metaverse and an electronic device according to various embodiments.

FIG. 2A is a view illustrating example message transmission and reception between a user in a metaverse and an electronic device according to various embodiments.

According to an embodiment, the electronic device 110 may communicate with the message server 200. The metaverse servers 210, 220, and 230 may communicate with the message server 200. The metaverse servers 210, 220, and 230 may be, e.g., the metaverse server 100 described with reference to FIG. 1, and may provide data for representing content for virtual reality and/or augmented reality. For example, the first metaverse server 210 may provide a first metaverse service and/or manage a user registered in the first metaverse service. For example, each of the second metaverse server 220 and the third metaverse server 230 may provide each of the second metaverse service and the third metaverse service and/or manage a user registered in the second metaverse service.

According to an embodiment, the message server 200 may process (e.g., transmit, send, and/or relay) a short messaging service (SMS)-based message, a multimedia messaging service (MMS)-based message, a rich communication service (RCS)-based message, and/or an iMessage-based message, and the format of the message processed by the message server 200 is not limited. For example, the message server 200 may identify reception information about the message requested to be transmitted and transmit the message to the electronic device corresponding to the identified reception information.

In an example embodiment, the electronic device 110 may transmit, e.g., a first message 231 including a first phone number as reception information to the message server 200. The message server 200 may transmit the first message to the electronic device 102 corresponding to the first phone number included in the first message 231. That the electronic device 102 corresponds to the first phone number may, for example, refer to a SIM including information associated with the first phone number being connected to the electronic device 102, or a profile associated with the first phone number being activated by the electronic device 102, but is not limited thereto. Meanwhile, the electronic device 102 may transmit a second message including a second phone number to the message server 200, and the server 200 may transmit the second message to the electronic device 110 corresponding to the second phone number. The electronic device 110 may execute, e.g., a message application and may display an execution screen of the message application. The execution screen of the message application may include, e.g., a message transmitted using the electronic device 110 as a sender and/or a message received using the electronic device 110 as a receiver. For example, the message application may provide a function of managing and/or displaying the transmitted and received messages for each external user. The external user may be (or may be associated with), e.g., a first phone number. For example, when the function of a message corresponding to the first phone number (or the name corresponding to the first phone number) is identified as being invoked, the message application may provide messages (e.g., text and/or multimedia files) that have been transmitted and received corresponding to the first phone number and/or a new message input window, but the information and/or objects constituting the application screen are not limited.

In an example embodiment, the electronic device 110 may transmit to the message server 200, as reception information, e.g., the second message 233 including the identification information about the first metaverse service (or the first metaverse server 210) and the first user identification information in the first metaverse service. For example, the first metaverse service identification information may be represented as a domain name such as "A.com", but is not limited thereto. The first user identification information (e.g., Neo) may be, e.g., identification information defined in the first metaverse service (e.g., newly generated in the first metaverse service), and may be unique in the first metaverse service, although the disclosure is not limited in this respect. Accordingly, the reception information (e.g., Neo@A.com) including the identification information about the first metaverse service and the first user identification information may be unique in the message server 200. For convenience of description, the reception information (e.g., Neo@A.com) including identification information about the first metaverse service and first user identification information may be referred to as an SIP account, and each SIP account may be unique. The format of the SIP account may be as shown in Table 1.

TABLE 1 sip:<metaverse_id>@<metaverse_domain>

In Table 1, "metaverse_id" may be user identification information defined in the metaverse service, and "metaverse_domain" may be identification information about the metaverse service (or metaverse server), e.g., a domain name, but the disclosure is not limited in this respect. According to an embodiment, the message server 200 may transmit the second message 233 to the first metaverse server 210 corresponding to the reception information included in the second message 233. As is described below, a metaverse agent included in the message server 200 or capable of interacting with the message server 200 may transmit and/or receive a message with the metaverse server. The metaverse server may operate a message inbox. The metaverse agent may transmit a message from the message inbox to the corresponding electronic device 110, and/or transmit a message from the electronic device 110 to the corresponding message inbox (or metaverse server). Accordingly, the message server 200 may transmit the second message 233 to the first metaverse server 200. For example, the second message may be transmitted to the metaverse server 210, based on identification information about the first metaverse service (or the first metaverse server 200) included in the second message 233 and first user identification information. Accordingly, the second message may be transmitted to the first metaverse server 210.

In an embodiment, the first metaverse server 210 may generate information for representing content based on at least some of the information included in the second message. The first metaverse server 210 may transmit the generated information to the electronic device 109 corresponding to the first user identification information. For example, the electronic device 109 may execute the application of the first metaverse service to log in based on the first user identification information. For example, the electronic device 109 may log in to the first metaverse server 210 based on the Internet, but the disclosure is not limited in this respect. The electronic device 109 may receive information for representing the content for the first metaverse service from the first metaverse server 210, and may represent the content for the first metaverse service based on the received information. Meanwhile, the first metaverse server 210 may transmit information for representing the second message to the electronic device 109. For example, the information included in the second message may be provided in the chat window of the first metaverse service, may be provided as an object in the first metaverse service, or may be provided as a function in the first metaverse service, and the method of providing the information is not limited.

In an example embodiment, it may be possible to transmit and receive messages between the metaverse servers 220 and 230. The second metaverse server 220 may transmit a third message 235 to the third metaverse server 230. For example, the third message 235 may include a third metaverse service (or the third metaverse server 230) and third user identification information as reception information. For example, the second metaverse server 220 may receive a message transmission request for the third metaverse service (or the third metaverse server 230) and the third user identification information from the electronic device (not shown) that has logged in using the second user identification information. The second metaverse server 220 may transmit the third message 235 including the third metaverse service (or the third metaverse server 230) and the third user identification information as reception information to the third metaverse server 230 based on the message transmission request. The third metaverse server 230 may receive the third message 235. The third metaverse server 230 may identify an electronic device (not shown) corresponding to the third user identification information for providing the information included in the third message 235, using the third user identification information included in the third message 235. The third metaverse server 230 may provide the external device with data for representing the information included in the third message 235 and/or the metaverse service for the third user identification information. Accordingly, a multiverse service for transmitting and receiving messages between heterogeneous metaverse servers 220 and 230 may be provided.

Figure 2B:
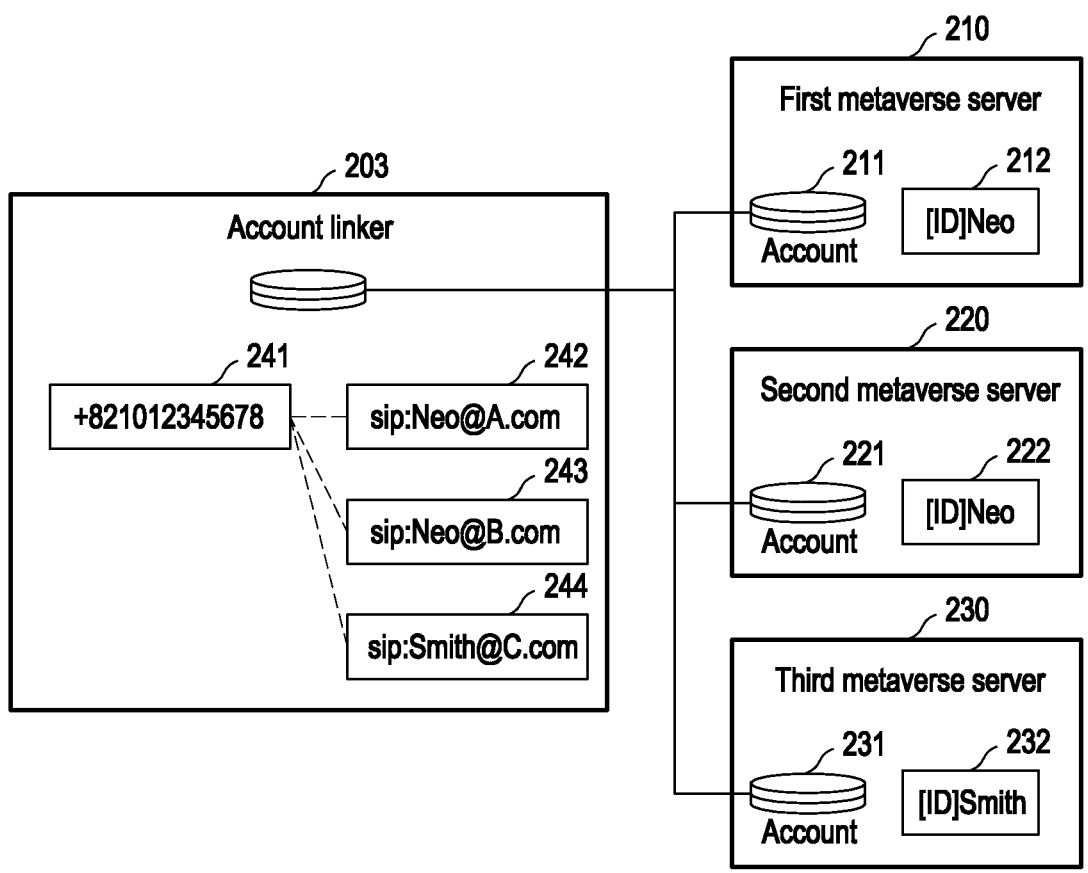
FIG. 2B is a view illustrating an example account linker-based account connection according to an embodiment.

FIG. 2B is a view illustrating an example account linker-based account connection according to an embodiment.

According to an embodiment, the account linker 203 may connect the phone number 241 (e.g., +821012345678) and at least one SIP account 242, 243, and 244 corresponding thereto, and store and/or manage them. For example, the message server 200 of FIG. 2A may include an account linker 203, or the message server 200 may access the account linker 203 to refer to information stored in the account linker 203. For example, the user of the phone number 241 (e.g., +821012345678) may subscribe to the first metaverse service A.com using the user identification information 212 of "Neo", subscribe to the second metaverse service B.com using the user identification information 222 of "Neo", and subscribe to the third metaverse service C.com using the user identification information 232 of "Smith". The metaverse servers 210, 220, and 230 may include databases 211, 221, and 231 storing user identification information. The electronic device, the account linker 203, and the first metaverse server 210 corresponding to the phone number 241 may perform a connection procedure between the phone number 241 and the first SIP account 242, and an example of the connection procedure is described below. The electronic device, the account linker 203, and the second metaverse server 220 corresponding to the phone number 241 may perform a connection procedure between the phone number 241 and the second SIP account 243. The electronic device, the account linker 203, and the third metaverse server 230 corresponding to the phone number 241 may perform a connection procedure between the phone number 241 and the third SIP account 244. As described above, at least one SIP account 242, 243, and 244 may be connected to correspond to the phone number 241 and be stored and/or managed. Meanwhile, although not illustrated, the account linker 203 may store an access token for accessing the metaverse service (or metaverse server) together with the at least one SIP account 242, 243, and 244 corresponding to the phone number 241.

The message server 200 according to an embodiment may convert at least some information about the transmitted and received messages and/or identify the electronic device receiving the message, using the connection information included in the account linker 203.

As described above, it is possible to transmit and receive messages between the phone number-based electronic device 110 and a user defined in the metaverse service. To make the metaverse virtual world field flourish, communication between users should be frequent and smooth. The life logging metaverse such as SNS is more popular than other metaverses because it takes communication between users as the core of the metaverse experience. The time that the metaverse user stays in the virtual world may be relatively short as compared to the real world. According to the transmission and reception of messages between the user of the real world and the user in the metaverse service as described above, communication between metaverse users may be possible regardless of the user's stay time in the metaverse service. This may enhance the metaverse experience and accessibility to the real world, and provide a new type of experience of communicating with metaverse users in the real world. Further, the metaverse service may be stimulated, and new services based on conversation between metaverse users may be created. It is also possible to conduct conversation without exposing the unique identifier (e.g., phone number or email address) to the other party in the real world of the electronic device 10.

Figure 3A:
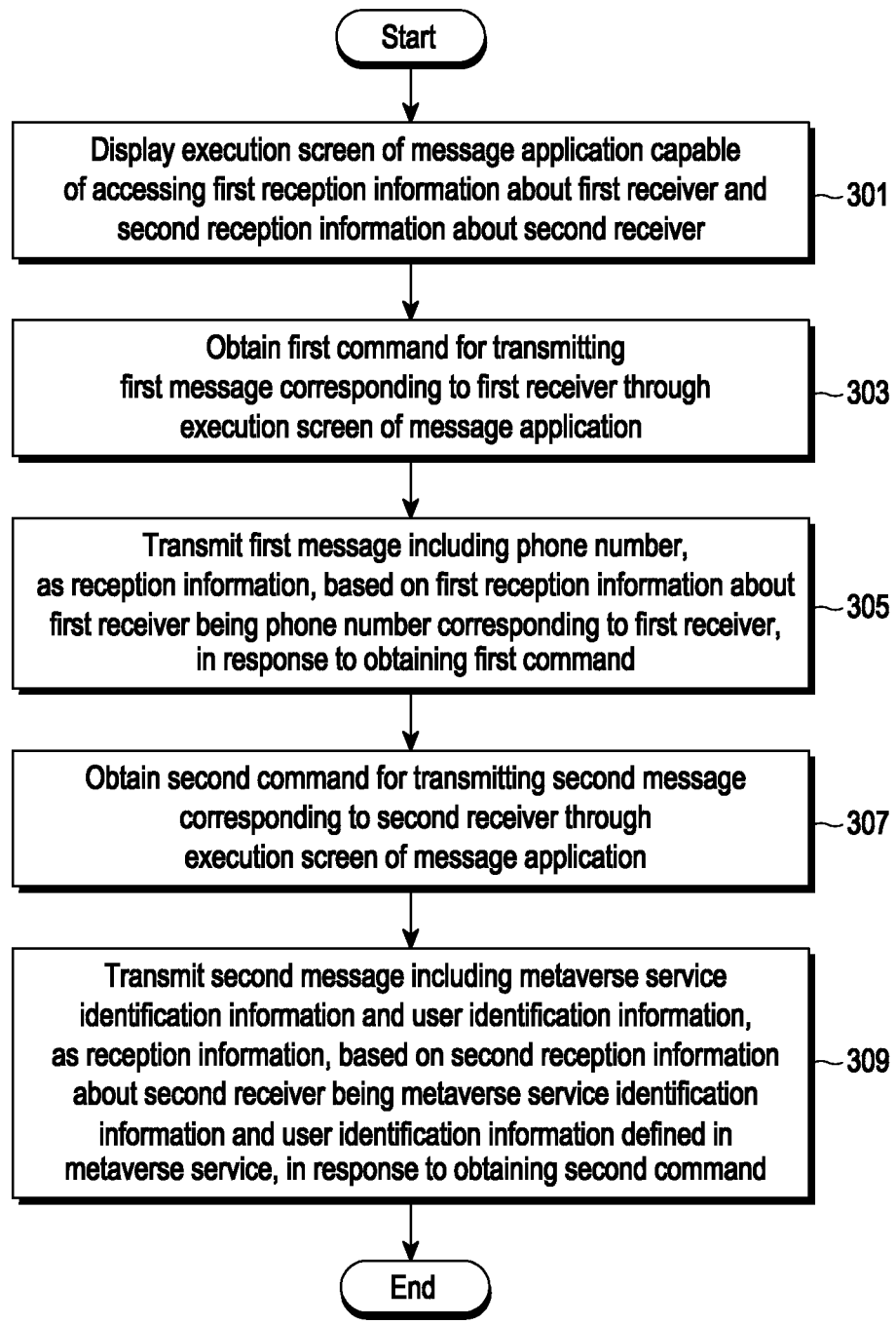
FIG. 3A is a flowchart illustrating an example operation method of an electronic device according to an embodiment.
Figure 3B:
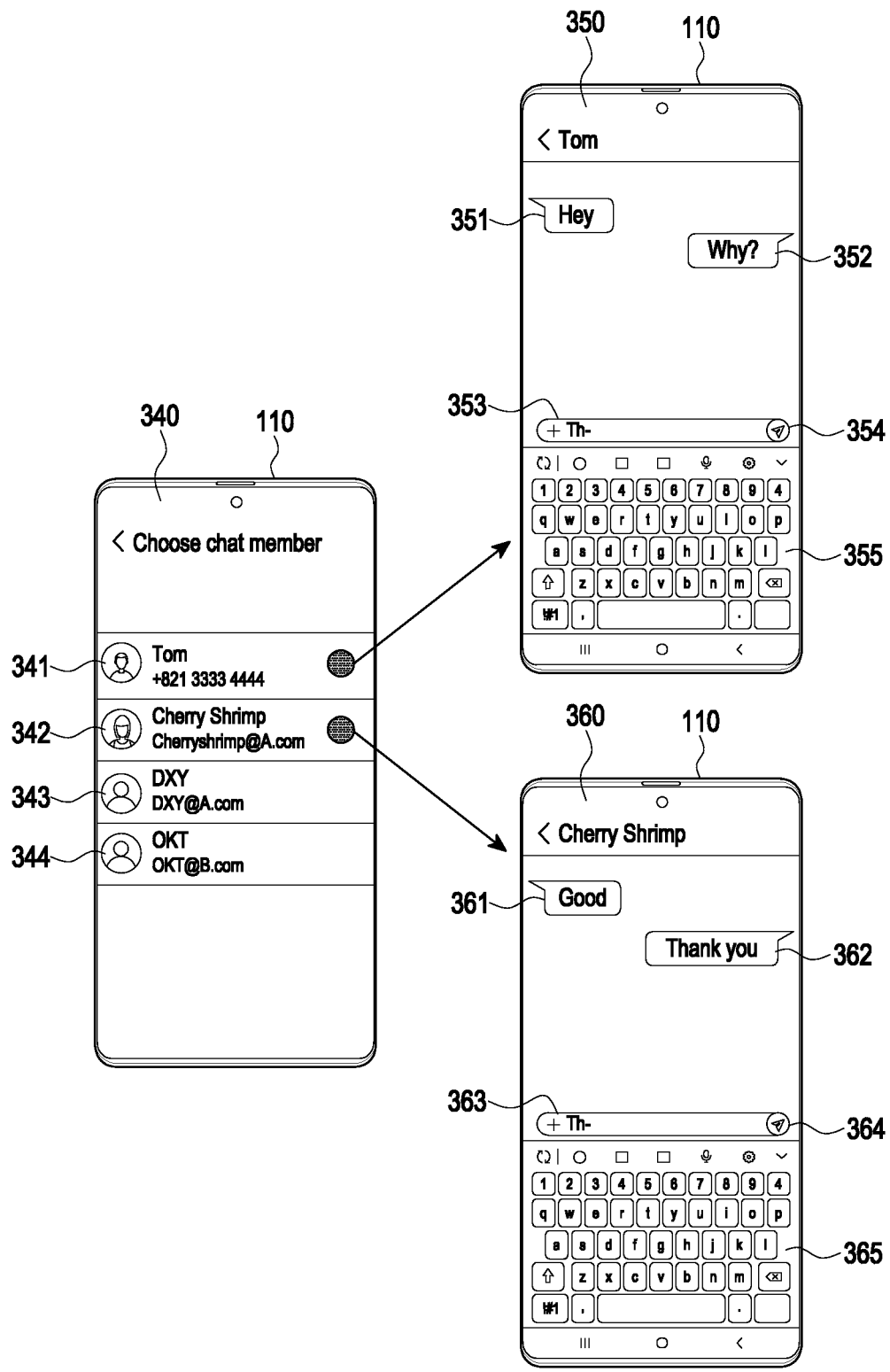
FIG. 3B is a view illustrating example execution screens of a message application according to an embodiment.

FIG. 3A is a flowchart illustrating an example operation method of an electronic device according to an embodiment. The embodiment of FIG. 3A is described with reference to FIG. 3B. FIG. 3B is a view illustrating example execution screens of a message application according to an embodiment.

Referring to FIGS. 3A and 3B together, according to an embodiment, in operation 301, the electronic device 110 (e.g., the processor 111) may display an execution screen 340 of a message application capable of accessing first reception information about a first receiver and second reception information about a second receiver. The execution screen 340 of the message application may include at least one tab 341, 342, 343, and 344 respectively corresponding to at least one other party to the conversation. The message application may provide at least one tab 341, 342, 343, and 344 capable of providing transmitted and received messages to each other party to the conversation. The message application may include contact information about the other party to the conversation or may load contact information from the contact application. For example, the message application (or contact application) may store the phone number of "+82133334444" as contact information for the name of "Tom", the SIP account of "Cherryshrimp@A.com" as contact information for the name of "Cherry Shrimp", the SIP account of "DXY@A.com" as contact information for the name of "DXY", and the SIP account of "OKT@B.com" as contact information for the name of "OKT". The message application (or contact application) may manage the SIP account including identification information about the metaverse service and user identification information, as well as the phone number based on the existing message transmission and reception protocol, as contact information.

According to an embodiment, in operation 303, the electronic device 110 may obtain a first command for transmitting a first message corresponding to the first receiver through the execution screen of the message application. For example, based on the tab 341 corresponding to designation of the tab 341 corresponding to "Tom" on the application execution screen 340, the electronic device 110 may display a screen 350 for displaying message(s) transmitted/received with the other party "Tom" to the conversation. The screen 350 may include at least one message 351 and 352 transmitted and received with the other party "Tom" to the conversation, a text window 353 for inputting text for a new message, a message transmission button 354, and/or a virtual keyboard 355 for inputting text. For example, the electronic device 110 may obtain the first command for transmitting the first message corresponding to the first receiver (e.g., Tom) based on selection of the message transmission button 354 after the text is input to the text window 353 according to the designation of the virtual keyboard 355. It will be understood by one of ordinary skill in the art that the message application may transmit and receive multimedia files such as voice, image, and video together with (or in place of) text.

According to an embodiment, in operation 305, in response to obtaining the first command, the electronic device 110 may transmit a first message including the phone number as the reception information to, e.g., the message server 200, based on the first reception information about the first receiver being the phone number corresponding to the first receiver. The electronic device 110 may transmit, e.g., the first message including the phone number (+82133334444) as the reception information, based on the first reception information about the first receiver "Tom" being the phone number (+82133334444). The message server 200 may identify the phone number (+82133334444) included, as reception information, in the first message and may transmit the first message to the electronic device corresponding to the phone number (+82133334444). Accordingly, the electronic device (e.g., the electronic device possessed by Tom) corresponding to the phone number (+82133334444) may display the received first message.

According to an embodiment, in operation 307, the electronic device 110 may obtain a second command for transmitting the first message corresponding to the second receiver through the execution screen of the message application. For example, based on designation of the tab 342 corresponding to "Cherry Shrimp" on the application execution screen 340, the electronic device 110 may display a screen 360 for displaying the message transmitted/received with the other party "Cherry Shrimp" to the conversation. The screen 360 may include at least one message 361 and 362 transmitted and received with the other party "Cherry Shrimp" to the conversation, a text window 363 for inputting text for a new message, a message transmission button 364, and/or a virtual keyboard 365 for inputting text. For example, the electronic device 110 may obtain the second command for transmitting the second message corresponding to the second receiver (e.g., Cherry Shrimp), based on selection of the message transmission button 364 after the text is input to the text window 363 according to the designation using the virtual keyboard 365.

According to an embodiment, in operation 309, in response to obtaining the second command, the electronic device 110 may transmit, e.g., the second message including the identification information about the metaverse service and the user identification information as the reception information to the message server 200, based on the second reception information about the second receiver being identification information about the metaverse service and the user identification information defined in the metaverse service. The electronic device 110 may transmit the second message including the SIP account (Cherryshrimp@A.com) as the reception information, based on the second reception information about the second receiver "Cherry Shrimp" being the SIP account (Cherryshrimp@A.com). The message server 200 may identify the SIP account (Cherryshrimp@A.com) included in the second message as reception information, and may transmit the second message to the first metaverse server 210 corresponding to the SIP account (Cherryshrimp@A.com). The first metaverse server 210 may transmit a second message or data for representing the second message to the electronic device connected using "Cherry Shrimp", which is user identification information. Accordingly, the electronic device connected using "Cherry Shrimp" may provide the second message or content in which information about the second message and the metaverse service are together represented. Meanwhile, the message server 200 may convert the phone number, which is transmission information about the second message, into an SIP account connected to the corresponding phone number. Accordingly, the privacy of the sender may be enhanced, which is described below. As described above, the electronic device 110 may transmit a message including a phone number as reception information. Alternatively, the electronic device 110 may transmit a message including identification information about the metaverse service and user identification information (e.g., an SIP account), and accordingly, it is possible to transmit and receive messages between the sender based on the phone number and the receiver based on metaverse-related information.

Figure 3C:
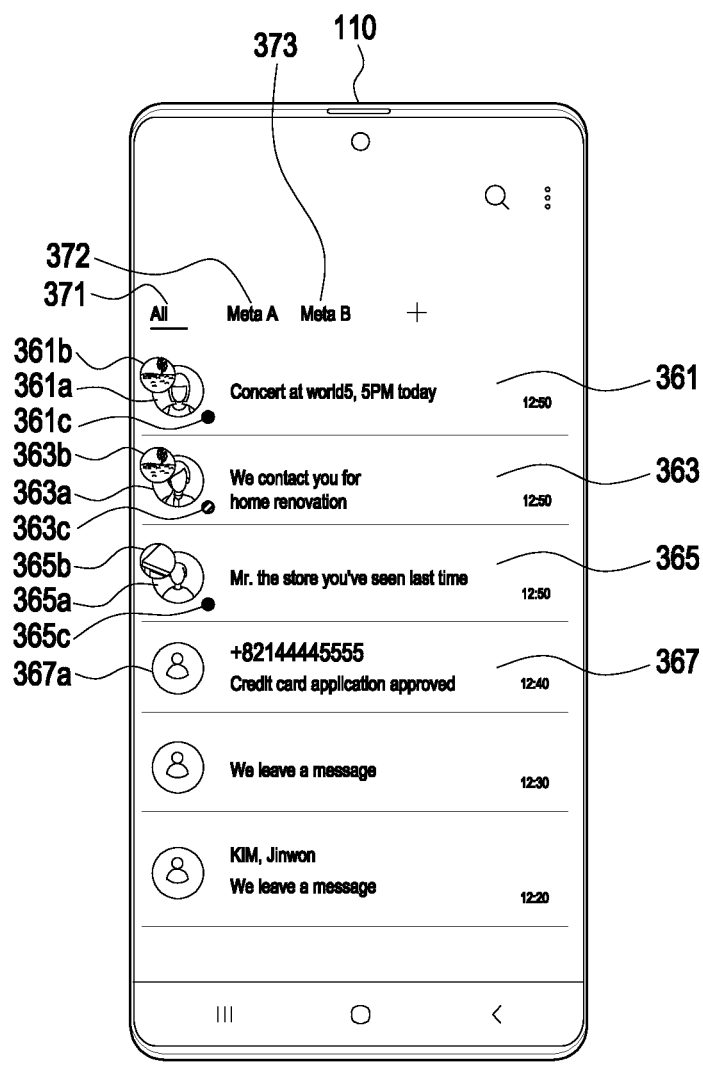
FIGS. 3C, 3D, and 3E illustrate example execution screens of a message application according to various embodiments.
Figures 3D, 3E:
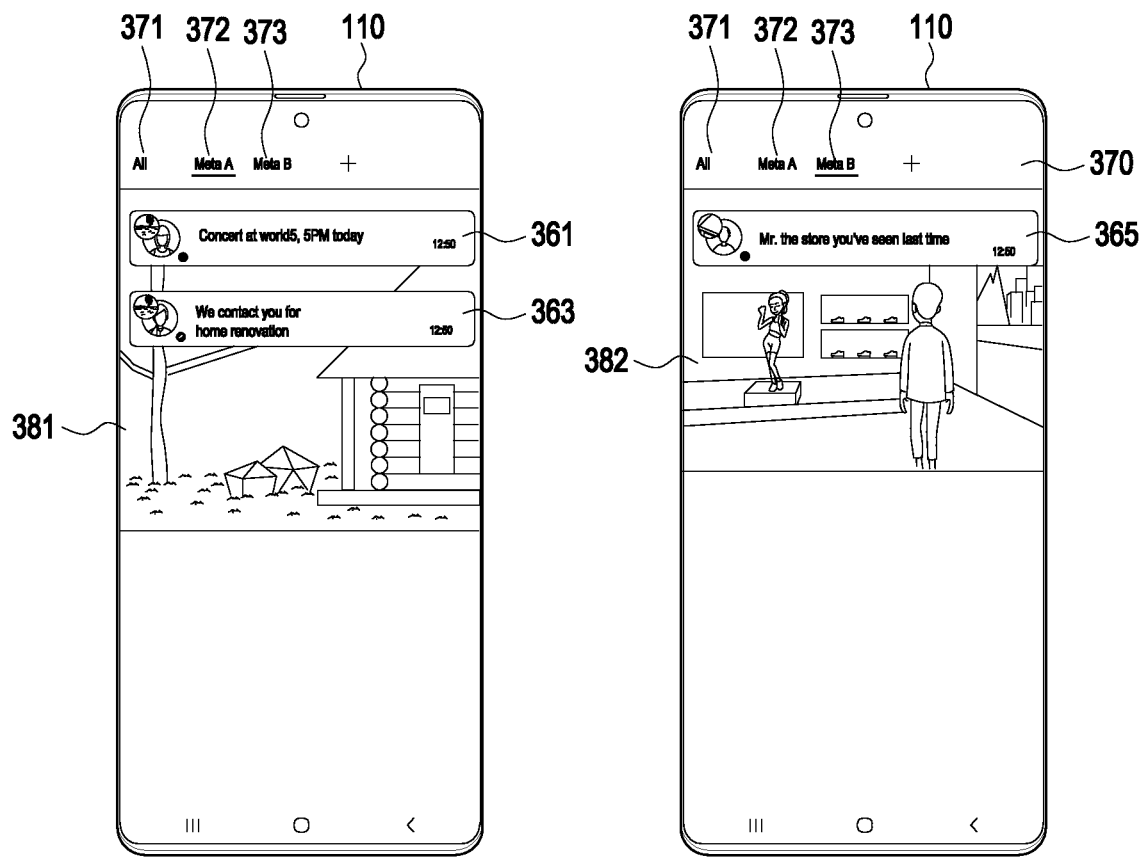

FIGS. 3C, 3D, and 3E illustrate example execution screens of a message application according to various embodiments.

According to an embodiment, the electronic device 110 may display an execution screen of a message application as shown in FIG. 3C. The execution screen of the message application may include a first tab 371 for all messages, a second tab 372 for a first metaverse service ("Meta A"), and a third tab 373 for a second metaverse service ("Meta B"). The application execution screen of FIG. 3C may be, e.g., a screen displayed when the first tab 371 is selected. When the first tab 371 is selected, a tab 367 associated with another party to the conversation including a phone number as contact information, a tab 361 associated with another party to the conversation including an SIP account corresponding to a first user of the first metaverse service as contact information, a tab 363 associated with another party to the conversation including an SIP account corresponding to a second user of the first metaverse service as contact information, and a tab 365 associated with another party to the conversation including an SIP account corresponding to a third user of the second metaverse service as contact information may be displayed together. For example, the tab 361 may include an image 361a (which may be a photo or a character in the metaverse service but is not limited) associated with the first user of the first metaverse service. For example, the tab 361 may include an image 361b for identifying the first metaverse service. For example, the tab 361 may include a first indicator 361c indicating that the first user logs in to the first metaverse service. For example, the metaverse agent (not shown) included in the message server 200 or accessible by the message server 200 may identify whether the user logs in for each metaverse service, and accordingly, the message server 200 may identify whether the user logs in for each metaverse service. The electronic device 110 may identify whether the first user of the first metaverse service logs in from the message server 200 (or from the metaverse agent). For example, the tab 363 may include an image 363a (which may be a photo or a character in the metaverse service but is not limited) associated with the second user of the first metaverse service. For example, the tab 363 may include an image 363b for identifying the first metaverse service. For example, the tab 363 may include a second indicator 363c indicating that the second user does not log in to the first metaverse service. As described above, the electronic device 110 may receive information indicating that the second user of the first metaverse service does not log in from the message server 200 (or from the metaverse agent), and may display the second indicator 363c based on the information. For example, the tab 365 may include an image 365a associated with a third user of the second metaverse service (which may be a photo or a character in the metaverse service, but is not limited thereto). For example, the tab 365 may include an image 365b for identifying the second metaverse service. For example, the tab 365 may include a first indicator 365c indicating that the third user does not log in to the second metaverse service. For example, the tab 367 may include an image 367a which is associated with another party to the conversation. Image 367a is a generic image. For example, a tab for which the transmission and reception time of the latest transmitted/received message is closer (i.e., more recent) may be positioned relatively higher, but this is by way of example without limitation, and the order of arrangement of the tabs 361, 363, 365, and 367 is not limited.

According to an embodiment, the electronic device 110 may display an execution screen of a message application as shown in FIG. 3D. For example, when the second tab 372 is selected, the electronic device 110 may display a screen including at least one tab 361 and 363 corresponding to at least one other party associated with the first metaverse service corresponding to the second tab 372. For example, a background 381 of the screen may be a screen associated with the first metaverse service. For example, as illustrated in FIG. 3E, when the third tab 373 is selected, the electronic device 110 may display a screen including at least one tab 365 corresponding to at least one other party associated with the second metaverse service corresponding to the third tab 373. For example, the background 382 of the screen may be a screen associated with the second metaverse service.

Figure 4A:
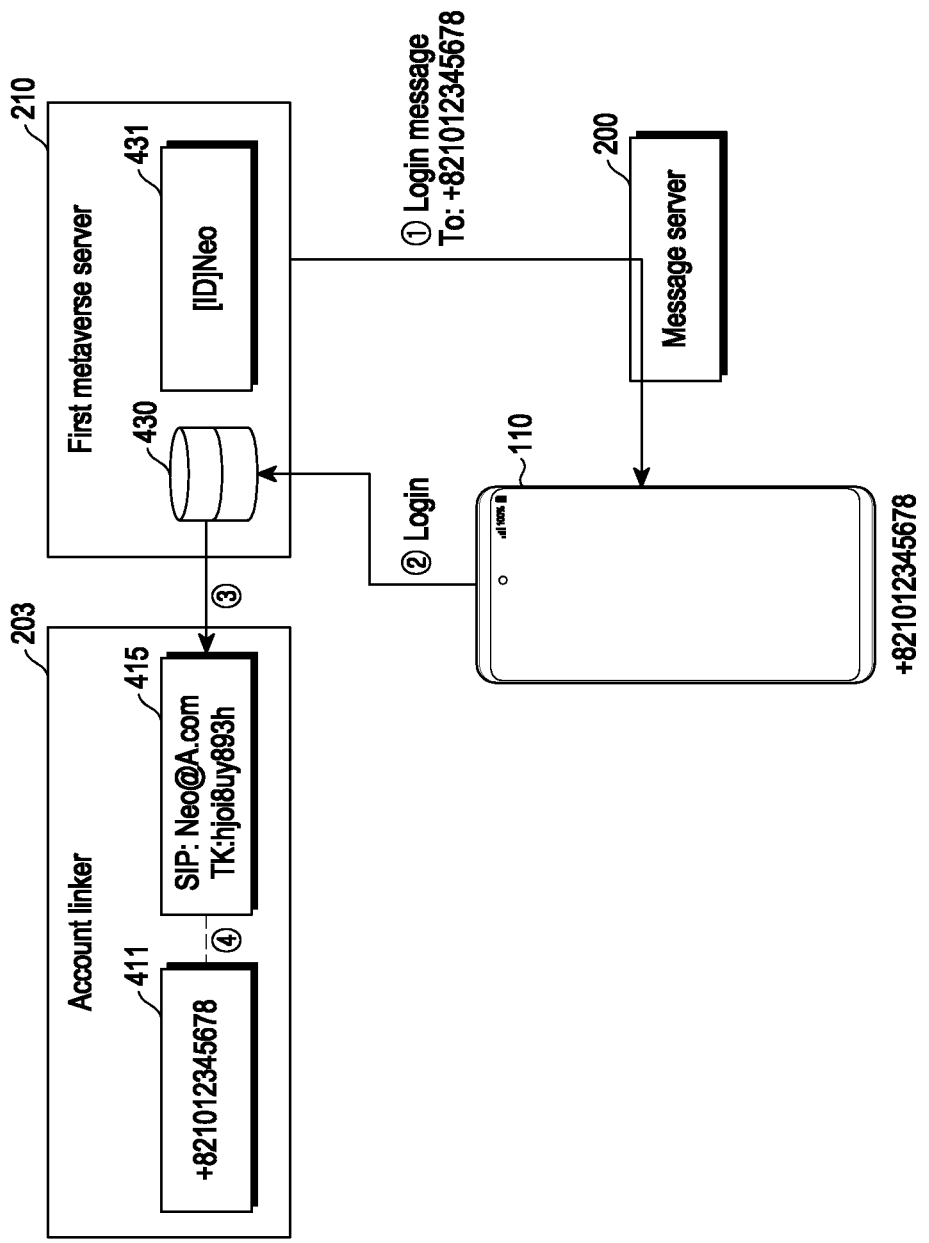
FIG. 4A is a view illustrating an example SIP account connection procedure according to an embodiment.
Figure 4B:
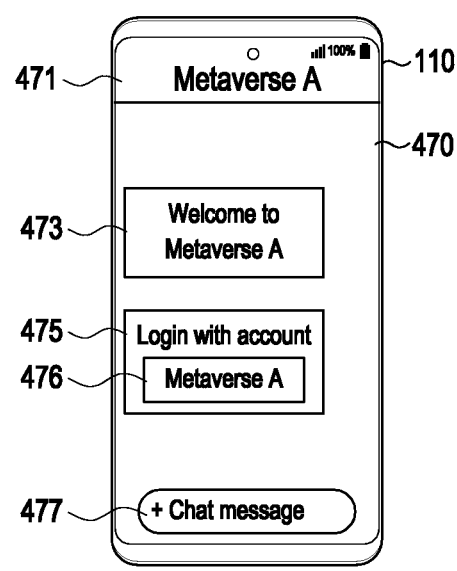
FIG. 4B illustrates an example screen for login according to an embodiment.

FIG. 4A is a view illustrating an example SIP account connection procedure according to an embodiment. The embodiment of FIG. 4A is described with reference to FIG. 4B. FIG. 4B illustrates an example screen for login according to an embodiment.

According to an embodiment, the first metaverse 210 may transmit a login message to the electronic device 110 through the message server 200. The transmission of the login message may be performed by, e.g., a chatbot executed by the first metaverse server 210, but is not limited thereto. Based on the reception of the login message, e.g., referring to FIG. 4B, the electronic device 110 may display a screen 470 for login based on the login message. The screen 470 may be, e.g., a screen of a message application. The screen 470 may include a tab 471 displaying identification information for the other party, and the tab 471 may include identification information (e.g., "Metaverse A") corresponding to the first metaverse server 210. The screen 470 may include objects 473 and 475 corresponding to messages transmitted and received with the other party. For example, the object 475 may include a function key 476 for logging in to the first metaverse server 210. The screen 470 may include an input window 477 for inputting a conversation message. When the input window 477 is designated, a virtual keyboard may be invoked. Based on the function key 476 being designated, the electronic device 110 may transmit a message for login for the specific user account 431 to the first metaverse server 210. The first metaverse server 210 may log in to the corresponding user account 431 based on the reception of the message for login, and the related information may be stored in the account database 430. For example, the electronic device 110 may display a login screen for the metaverse service based on the designation of the function key 476. Based on input of login information (e.g., user identification information and/or password) through the login screen, the electronic device 110 may transmit a message for login to the first metaverse server 210. If the login is successful, a token capable of accessing the metaverse service or a code for issuing the token may be generated. The token may have an expiration date, but the disclosure is not limited in this respect. The first metaverse server 210 may provide the login result to the account linker 203. The login result may include, for example, a phone number, an SIP account, and/or a token for access, but is not limited thereto. The account linker 203 may match the phone number 411 and its corresponding SIP account and the token 415 based on the received login result and store and/or manage them. According to the above-described process, the correspondence relationship between the phone number, the SIP account, and/or the token for access may be stored and/or managed in the account linker 203, but is not limited thereto.

Figure 5A:
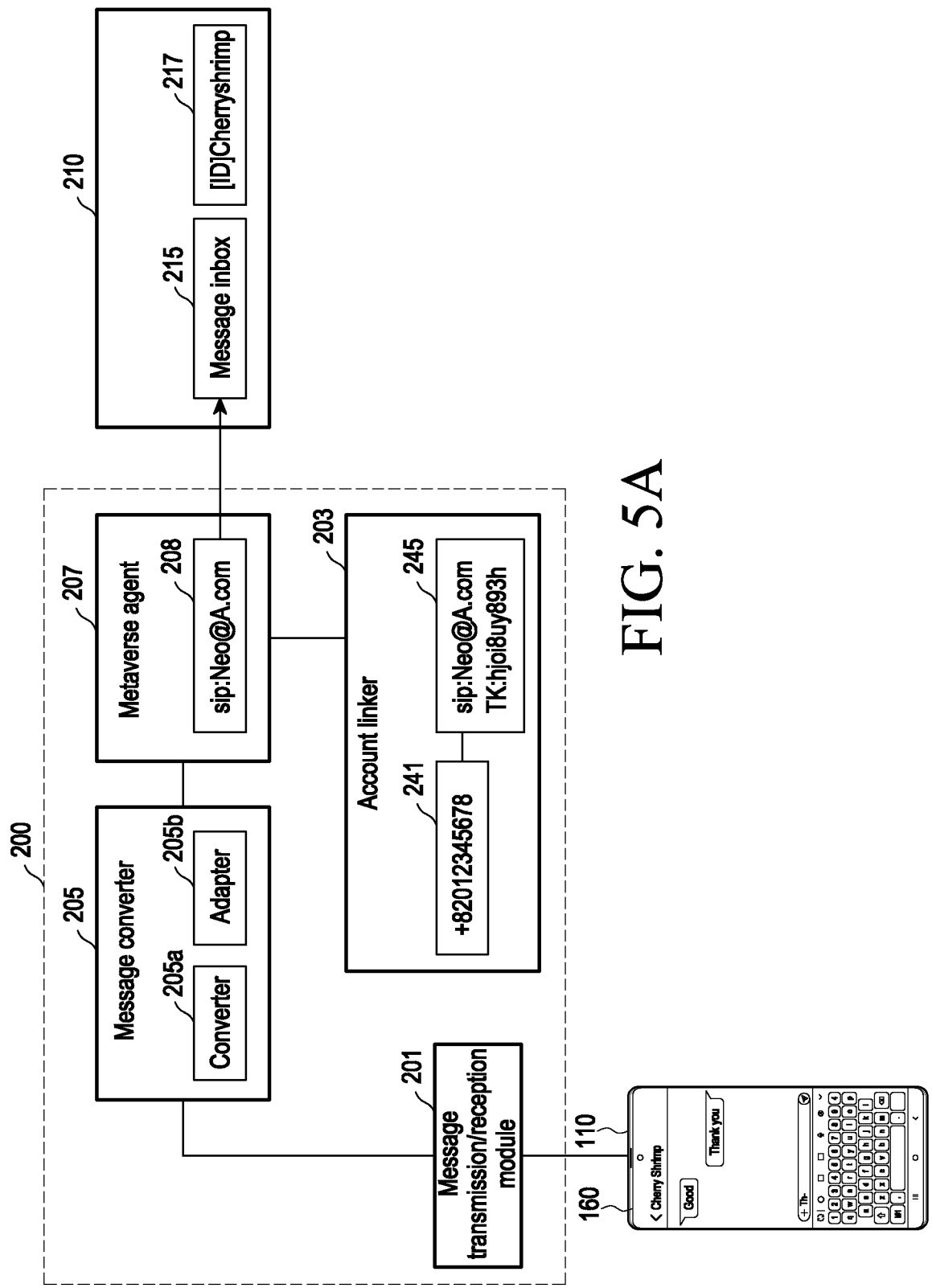
FIG. 5A is a view illustrating example operations of an electronic device, a message server, and a metaverse server according to an embodiment.
Figure 5B:
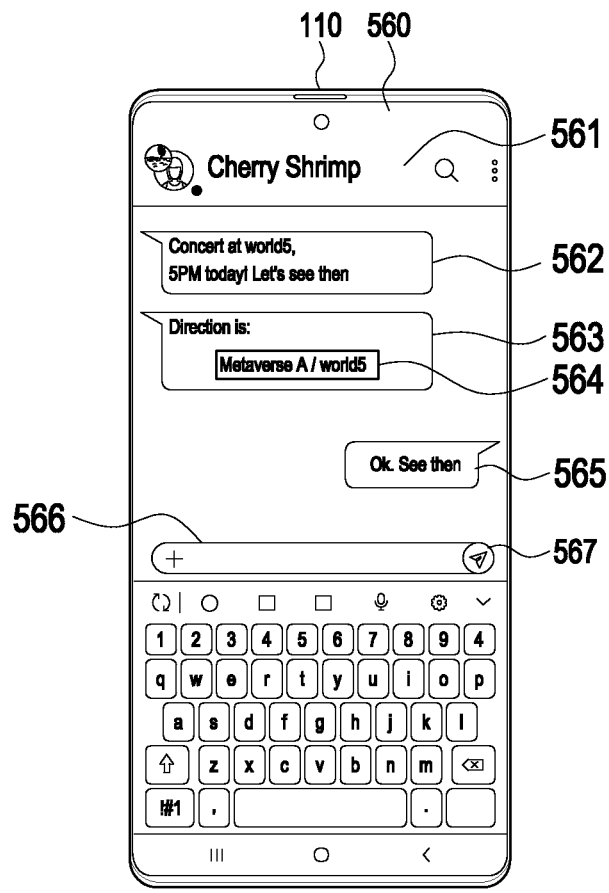
FIG. 5B illustrates an example screen displayed on an electronic device according to an embodiment.

FIG. 5A is a view illustrating example operations of an electronic device, a message server, and a metaverse server according to an embodiment. The embodiment of FIG. 5A is described with reference to FIG. 5B. FIG. 5B illustrates an example screen displayed on an electronic device according to an embodiment.

According to an embodiment, the electronic device 110 may correspond to the phone number of "+821012345678". For example, the electronic device 110 may be connected to a SIM including information associated with the phone number of "+821012345678", or may activate a profile associated with the phone number of "+821012345678". For example, as described with reference to FIG. 3A, the electronic device 110 may transmit a message including "Cherryshrimp@A.com" as reception information to the message server 200.

According to an embodiment, the message server 200 may include, e.g., a message transmission and reception module 201 (including, e.g., transmission and reception circuitry). The message transmission and reception module 201 may receive, e.g., a message from the electronic device 110, or may transmit, to the electronic device 110, a message including the phone number of the electronic device 110 as reception information. The message server 200 may include an account linker 203, a message converter 205, and/or a metaverse agent 207, but this is merely an example, and at least some of the account linker 203, the message converter 205, and/or the metaverse agent 207 may be implemented independently from the message server 200.

According to an embodiment, the account linker 203 may connect and store and/or manage the user's unique identifier (e.g., a phone number, an email, or a representative account) commonly used in the real world and at least one SIP account configured based on metaverse service information. Transmission and reception of messages between metaverse service users and the users' unique identifiers (e.g., phone numbers) of the real world may be performed based on the information stored in the account linker 203 and, as described below, voice calls or video calls may also be conducted.

According to an embodiment, the message converter 205 may convert the message received from the electronic device 110 into a format supported by the metaverse service (or the corresponding domain). For example, the converter 205a may convert a standard of the message into a message standard used in a specific metaverse service. The converter 205a may convert, e.g., the phone number included in the "from" field of the message into user identification information defined on the metaverse service, and, in this case, may refer to information about the account linker 203. For example, the inverter 205b may convert a transmission and reception standard of the message into a transmission and reception standard used by the metaverse server. For example, each metaverse server may support a different message transmission and reception standard (or may be referred to as an interface, and may be at least one of HTTP, FTP, TCP, and SIP, but is not limited thereto), and the inverter 205b may perform conversion to a transmission and reception standard corresponding to a specific metaverse server.

According to an embodiment, the metaverse agent 207 may read a friend list corresponding to the user identification information in the metaverse service. The metaverse agent 207 may look up, merge, and provide the friend list stored for each piece of user identification information about the metaverse service obtained from the account linker 203 to the electronic device 110, and the message application of the electronic device 110 may store the friend list. For example, the message application of the electronic device 110 may request a friend list corresponding to a unique identifier (e.g., a phone number). The metaverse agent 207 may obtain the SIP accounts corresponding to the phone number from the account linker 203 based on the corresponding request.

The metaverse agent 207 may log in to each metaverse service to look up the friend list corresponding to the user identification information. The metaverse agent 207 may merge the looked-up friend list and provide the merged friend list to the message application. The metaverse agent 207 may identify whether the user identification information in the metaverse service is logged in, and may provide the identified result to the electronic device 110. The metaverse agent 207 may periodically read the message in the message inbox 215 on behalf of the message application or may read the message based on reception of a message reception event in order to transfer the message including the SIP account as the reception information to the message application of the real world user. For example, the user of "Cherryshrimp" of the first metaverse server 210 may transmit a message to "Neo" in the first metaverse service. A message having "Cherryshrimp" as transmission information and "Neo" as reception information may be stored in the message inbox 215 corresponding to "Cherryshrimp". The metaverse agent 207 may read the corresponding message from the message inbox 215. The metaverse agent 207 may identify the phone number corresponding to the SIP account and may transmit the message to the electronic device 110 corresponding to the identified phone number. For example, the SIP account 208 of "Neo@A.com" and token 245 may be connected to the phone number 241 (e.g., +821012345678) and stored in the account linker 203. The metaverse agent 207 may identify the phone number 241 (e.g., +821012345678) corresponding to the SIP account 208 of Neo@A.com, and the message may be transferred to the electronic device 110 corresponding to the phone number 241 (e.g., +821012345678). Accordingly, as illustrated in FIG. 5B, an execution screen 560 of a message application with "Cherry Shrimp" as another party 561 to the conversation may be displayed. Messages 562 and 563 using "Cherry Shrimp" as transmission information and "Neo" as reception information may be transferred to the electronic device 110 and displayed. The message 562 may include text, or the message 563 may include an additional function 564 together with the text. The additional function 564 may be, e.g., a function that causes the avatar to move to a specific virtual space in the metaverse service, but is not limited thereto. If the additional function 564 is selected, the content corresponding to a case in which the avatar of "Neo" of the first metaverse service corresponding to the electronic device 110 is located in the virtual space of "World5" of the first metaverse service may be provided. When the metaverse service provides a subscription function for a message reception event, the metaverse agent 207 may identify whether a new message is received, and accordingly, the metaverse agent 207 may read the corresponding message from the message inbox 215 at each corresponding time. When the metaverse service does not provide a subscription function, the metaverse agent 207 may periodically read a message from the message inbox 215.

According to an embodiment, the metaverse agent 207 may transmit a message including the SIP account from the electronic device 110 as reception information to the corresponding metaverse server. For example, a message with "+821012345678" as transmission information and "Cherryshrimp@A.com" as reception information may be received from the electronic device 110. The metaverse agent 207 may transmit the corresponding message to the first metaverse server 210 corresponding to "Cherryshrimp@A.com". For example, the metaverse agent 207 may transmit a message to the message inbox corresponding to the reception information using "Neo" (or a token for additional access), which is the account corresponding to the transmission information "+821012345678". Meanwhile, the transmission information about "+821012345678" may be converted into, e.g., user identification information about "Neo" defined in the first metaverse service. Accordingly, as illustrated in FIG. 5B, the message 565 transmitted from the electronic device 110 may be included in the execution screen 560 of the message application having "Cherry Shrimp" as the other party 561 to the conversation. As described above, the execution screen 560 of the message application may include a conversation window 566 and a transmission button 567.

Figure 5C:
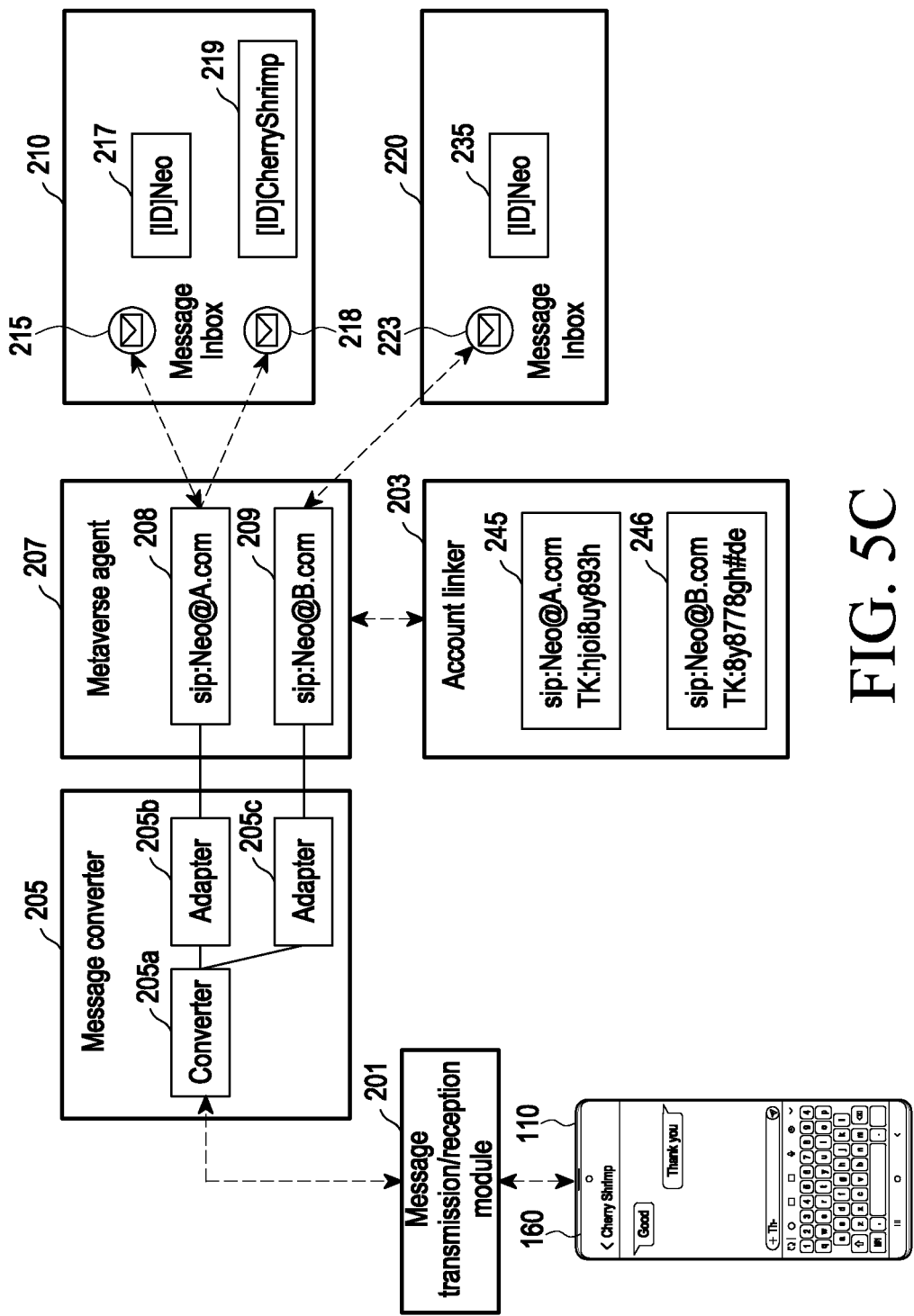
FIG. 5C is a view illustrating example operations of an electronic device, a message server, and a metaverse server according to an embodiment.

FIG. 5C is a view illustrating example operations of an electronic device, a message server, and a metaverse server according to an embodiment.

According to an embodiment, the message converter 205 may include adapters 205b and 205c for each metaverse service. The account linker 203 may store the SIP account and token 245 associated with the first metaverse service connected to the phone number and the SIP account and token 246 associated with the second metaverse service. The metaverse agent 207 may identify the first SIP account Neo@A.com 208 and the second SIP account Neo@B.com 209 corresponding to the phone number, based on the information from the account linker 203. The metaverse agent 207 may read messages from the message inboxes 215, 218, and 223 corresponding to the user identifiers 217, 219, and 235, or may transmit messages.

Figure 6A:
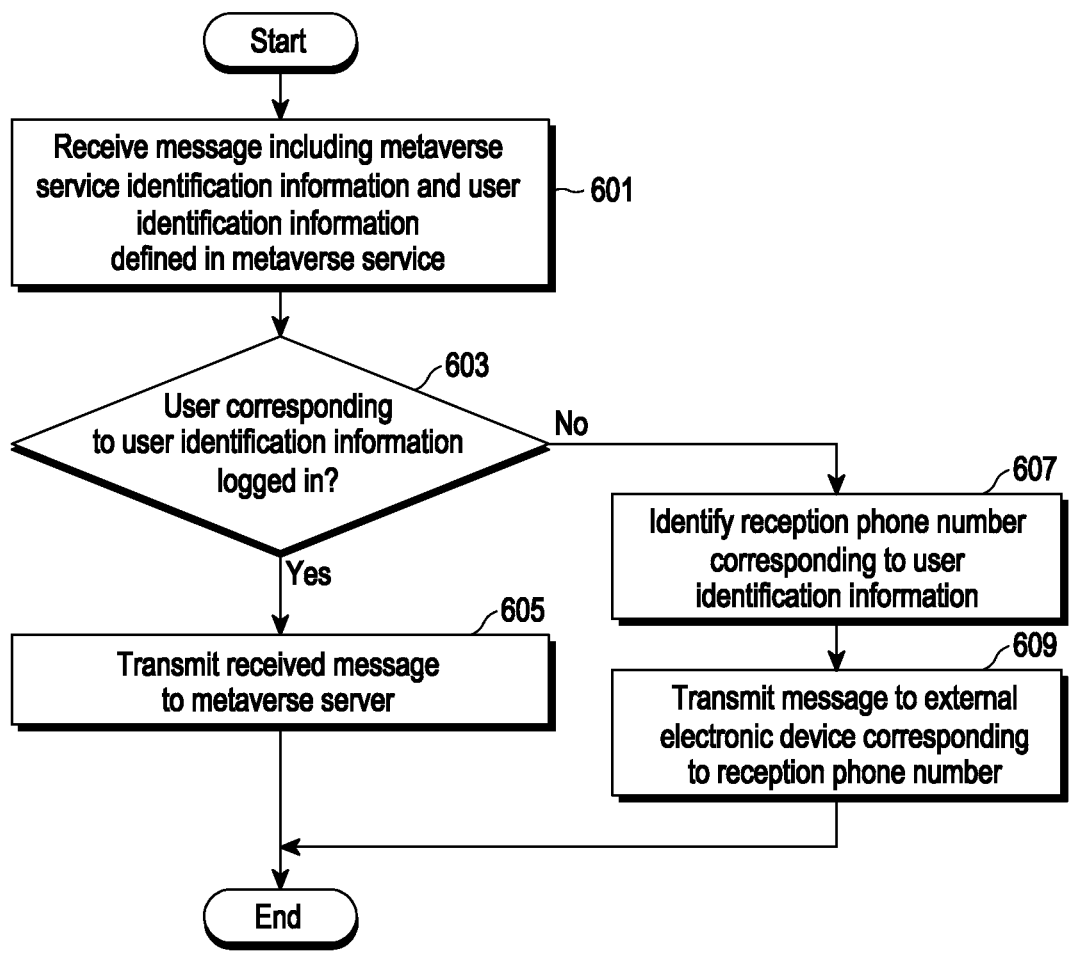
FIG. 6A is a flowchart illustrating an example operation method of a message server according to an embodiment.
Figure 6B:
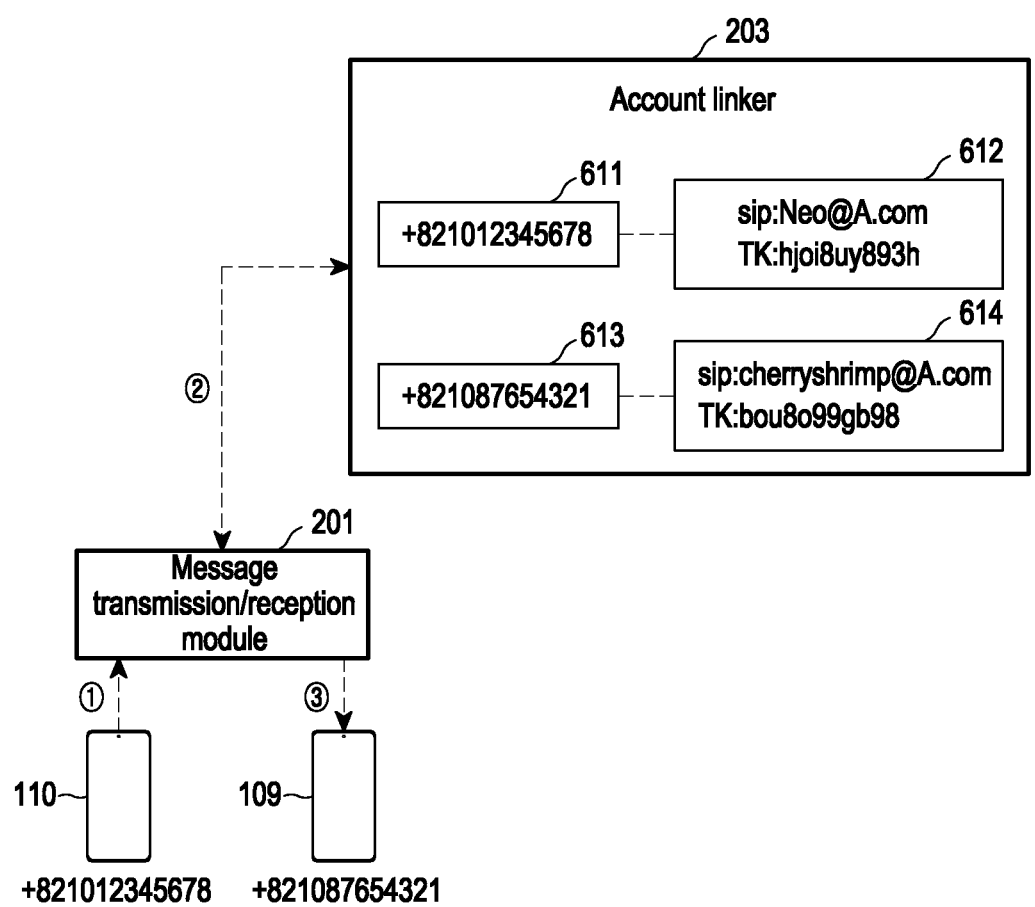
FIG. 6B is a view illustrating example operations of an electronic device and a message server according to an embodiment.
Figure 6C:
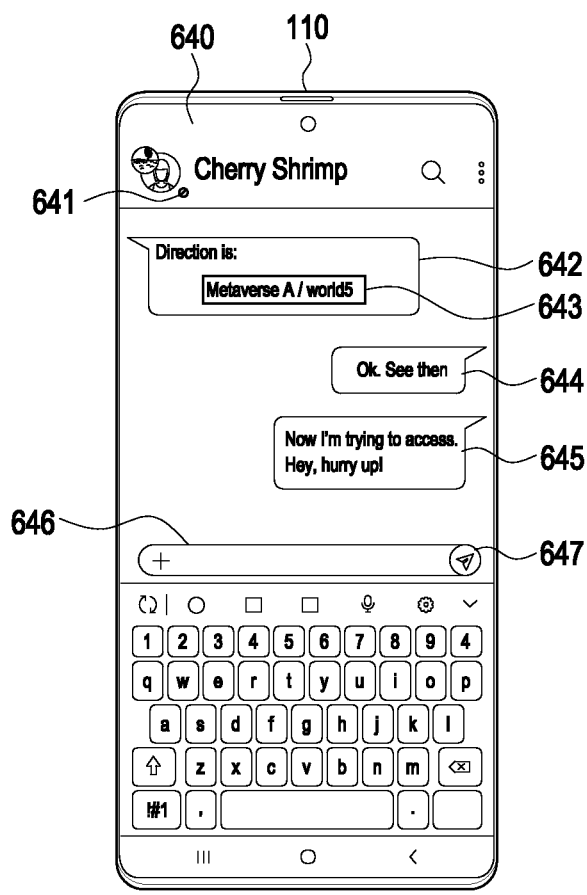
FIG. 6C illustrates an example screen displayed on an electronic device according to an embodiment.

FIG. 6A is a flowchart illustrating an example operation method of a message server according to an embodiment. The embodiment of FIG. 6A is described with reference to FIGS. 6B and 6C. FIG. 6B is a view illustrating example operations of an electronic device and a message server according to an embodiment. FIG. 6C illustrates an example screen displayed on an electronic device according to an embodiment.

According to an embodiment, in operation 601, the message server 200 may receive a message including identification information about the metaverse service and user identification information defined in the metaverse service. In operation 603, the message server 200 may identify whether the user corresponding to the user identification information is logged in. As described above, the metaverse agent 207 may identify whether to log in for each user identification information. If it is identified that the user identification information is a logged-in state, the message server 200 may transmit the received message to the metaverse server in operation 605. The metaverse server may provide content for representing the received message to the logged-in electronic device using the corresponding user identification information. Accordingly, the received message may be represented in the corresponding electronic device. If it is identified that the user identification information is a logged-out state, the message server 200 may identify the reception phone number corresponding to the user identification information in operation 607. For example, the account linker 203 may store a phone number corresponding to the corresponding user identification information, and the message server 200 may identify the phone number. In operation 609, the message server 200 may transmit a message to the external electronic device corresponding to the incoming phone number. For example, referring to FIG. 6B, the electronic device 110 may transmit a message including the SIP account of Cherryshrimp@A.com" to the message transmission and reception module 201. A first phone number 611 and a first SIP account and token 612 connected thereto, and a second phone number 613 and a second SIP account and token 614 connected thereto may be stored in the account linker 203. As described above, when "Cherry Shrimp" is logged out, a second phone number 613 (e.g., +821087654321) corresponding to "Cherryshrimp" may be referred to. Accordingly, when "Cherry Shrimp" is logged out, a message may be transmitted to the electronic device 109 corresponding to the second phone number 613 (e.g., +821087654321).

For example, as illustrated in FIG. 6C, the electronic device 110 may display the execution screen 640 of the message application. The screen 640 may include messages 642, 644, and 645 transmitted and received with the other party "Cherry Shrimp" to the conversation, a message window 646, and a transmission button 647. Meanwhile, as described above, an indicator 641 indicating whether the other party "Cherry Shrimp" to the conversation logs in may be displayed. Accordingly, the user of the electronic device 110 may identify that "Cherry Shrimp" is currently logged out of the first metaverse service by identifying the indicator 641. Even when "Cherry Shrimp" is logged out, the user may input a message requesting access, such as text included in the message 645, and select the transmission button 647. As described above, while "Cherry Shrimp" is in the logged-out state, a message may be transmitted to the electronic device 109 corresponding to the second phone number 613 (e.g., +821087654321) corresponding to "Cherry Shrimp". Accordingly, the user corresponding to "Cherry Shrimp" may identify the corresponding message through the electronic device 109.

Figure 7:
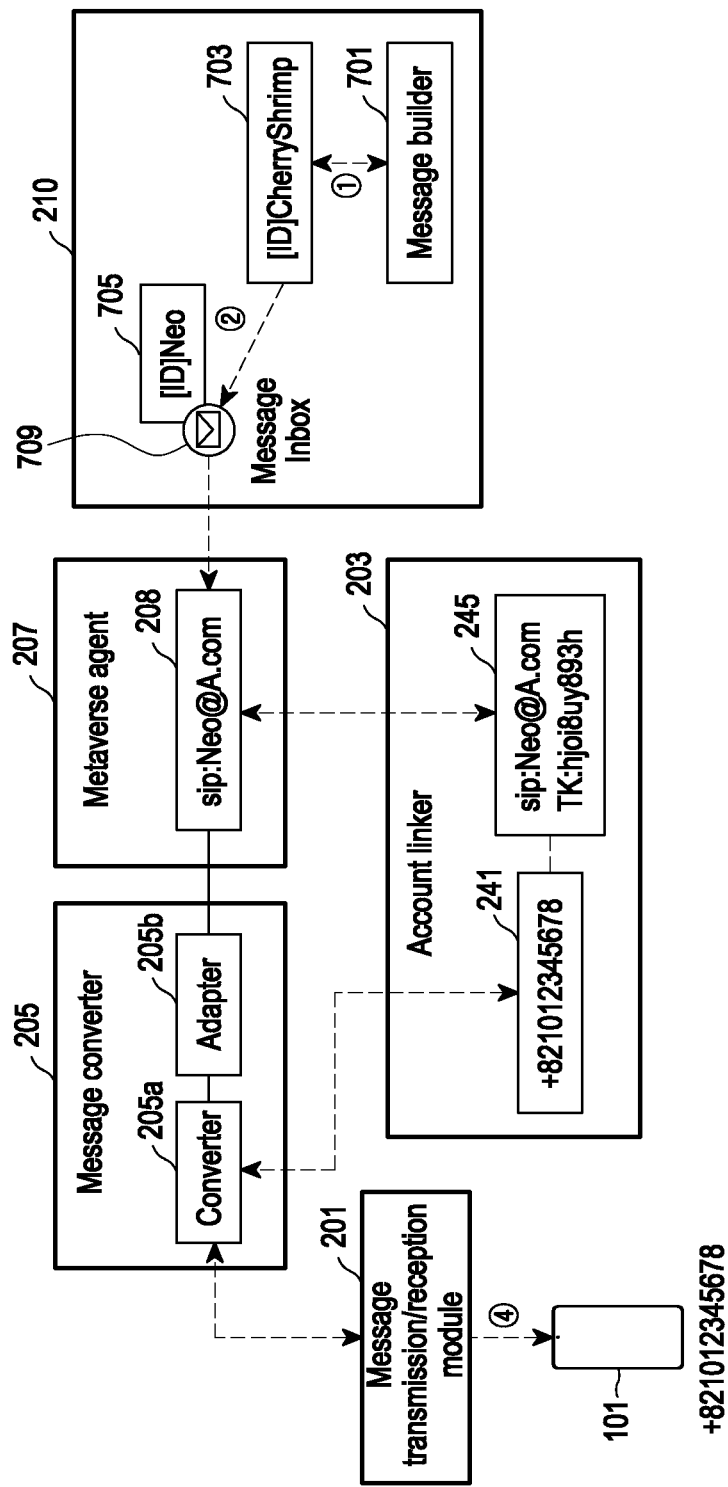
FIG. 7 is a view illustrating example operations of an electronic device, a message server, and a metaverse server according to an embodiment.

FIG. 7 is a view illustrating example operations of an electronic device, a message server, and a metaverse server according to an embodiment.

According to an embodiment, the first metaverse server 210 may include a message builder 701. The message builder 701 may generate a message including various functions (image, video, location information, button, app link, etc.) that may be used in the message application of the real world user, in the metaverse service. The message builder 701 may generate a message supporting the message application function of the real world user. For example, the message builder 701 may generate a message by adding a function of the message application without changing the message standard used in the specific metaverse service. For example, the message builder 701 may change the message standard to the standard of the message application. The message generated by the message builder 701 may be stored in the message inbox 709. For example, in the example of FIG. 7, a message from the transmission information 703 of "Cherry Shrimp" to the reception information 705 of "Neo" may be generated by the message builder 701. The message may be stored in a message inbox 709 (e.g., a message inbox of reception information), and the message server 200 may read the message stored in the message inbox 709. The message server 200 may identify a phone number corresponding to the reception information (e.g., Neo) and transmit a message to the electronic device 110 corresponding to the identified phone number.

In an embodiment, in general, the message may include, e.g., text and/or emoji. Meanwhile, the message application of the electronic device 110 may provide more various functions. For example, the message application may provide a function of transmitting and receiving media of a voice, an image, or a video, and/or may provide a function of transmitting and receiving location information about a user, a map, a web link, or an app link. The message builder 701 may generate a message supporting the above-described message application function.

For example, the message builder 701 may generate a message including a screenshot, a video clip, a voice recording, and location information in the virtual space within the metaverse service. The message may be generated in a form that may be processed by the message converter 205, but is not limited thereto. The message generated by the message builder 701 may be converted according to a conventional message transmission and reception standard such as RCS, but is not limited thereto. The message application of the electronic device 110 may receive and provide the corresponding message.

Figure 8:
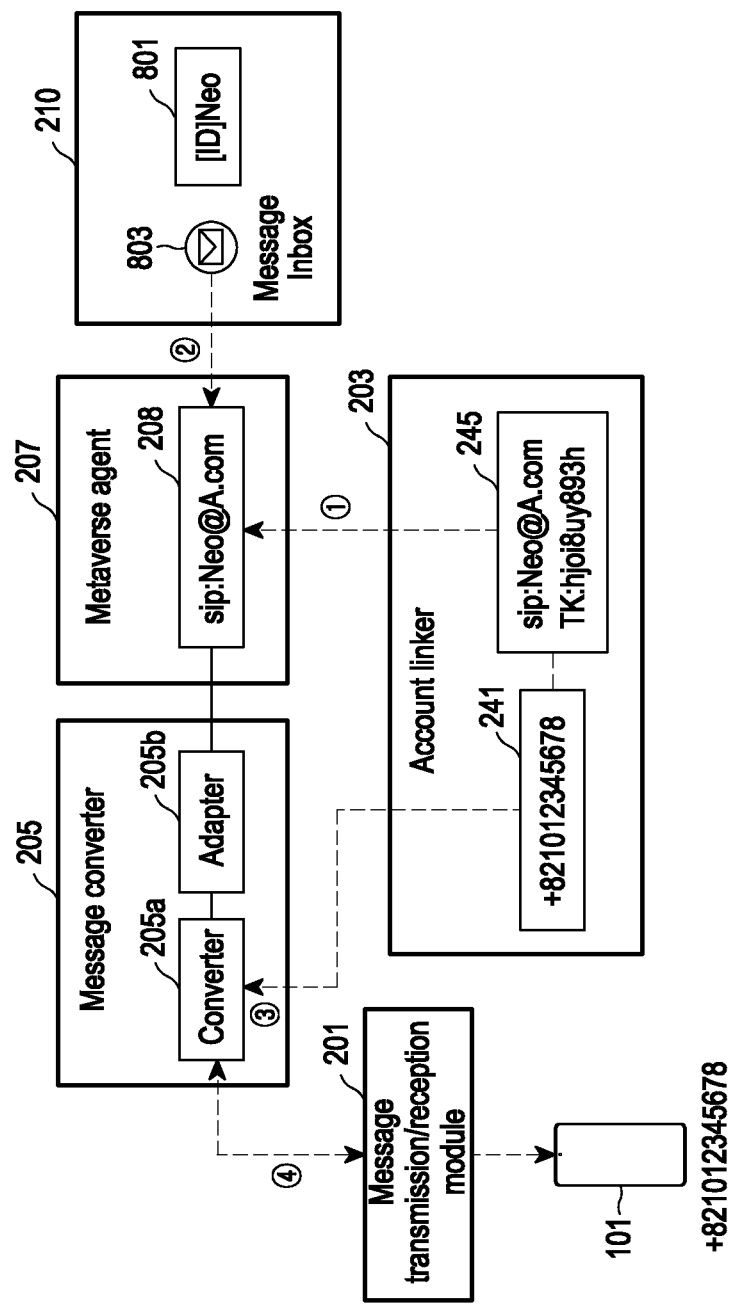
FIG. 8 is a view illustrating example operations of an electronic device, a message server, and a metaverse server according to an embodiment.

FIG. 8 is a view illustrating example operations of an electronic device, a message server, and a metaverse server according to an embodiment.

According to an embodiment, the metaverse agent 207 may read a message from the message inbox 803 of the metaverse service corresponding to the corresponding user identification information 801 at a predetermined period using the user identification information and the access token 245 of the metaverse service in the account linker 203. For example, the metaverse agent 207 may obtain the user identification information and the access token 245 of the metaverse service from the account linker 203 at a predetermined period, but the time of obtaining the user identification information and the access token 245 is not limited. The metaverse agent 207 may compare the most recent read message with the message received in this period, and may determine whether a new message is generated based on the comparison result. If it is identified that a new message occurs, the message may be converted, e.g., through the message converter 205, and the converted message may be provided to the message application. The message converter 205 converts the obtained message to match the message structure and function used in the message application. The user identification information in the metaverse service included in the reception information about the message may be changed to identification information (e.g., a phone number) used in the message application in the real world. The transmission information in the message may include user identification information defined in the metaverse service, and the reception information may be a unique identifier (e.g., a phone number) of the message application. For example, the message application may represent that the corresponding message is transmitted from the user of a specific metaverse service using an icon and/or additional text.

Figure 9:
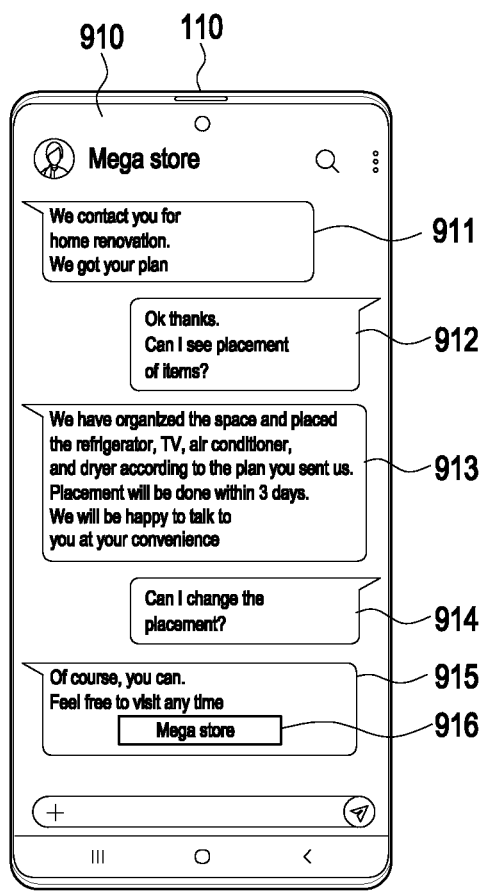
FIG. 9 illustrates an example screen displayed on an electronic device according to an embodiment.

FIG. 9 illustrates an example screen displayed on an electronic device according to an embodiment.

According to an embodiment of the disclosure, the electronic device 110 may transmit and receive messages to and from an operator of a shop in the metaverse service. For example, in the virtual world of the metaverse service, a store of a specific brand may be placed. An avatar may visit the store in the virtual world, and product information or promotion information related to the corresponding brand may be provided to the corresponding store. Meanwhile, user identification information about the metaverse service may also be assigned to the operator of the corresponding brand. Accordingly, the electronic device 110 may transmit a message including identification information about the metaverse service and user identification information about the operator. The electronic device 110 may display, e.g., an execution screen 910 of a message application as shown in FIG. 9. The messages 912 and 914 transmitted from the electronic device 110 and the messages 911, 913, and 915 received from the operator of the brand may be arranged on the screen 910, e.g., in chronological order. For example, the message 916 may include a function button 916 capable of visiting the store in the virtual world. For example, when the function button 916 is selected, the electronic device 110 may execute the metaverse application and may represent content in which the corresponding virtual space is represented.

Figure 10A:
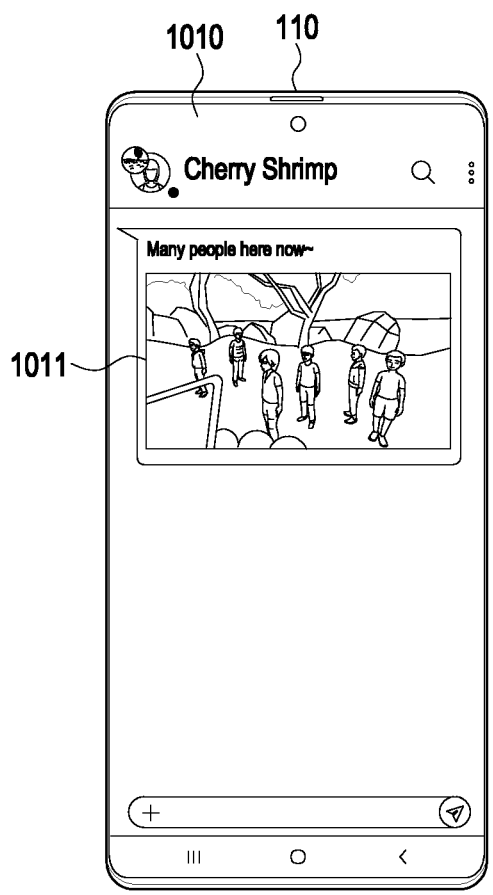
FIG. 10A illustrates an example screen displayed on an electronic device according to an embodiment.

FIG. 10A illustrates an example screen displayed on an electronic device according to an embodiment.

According to the embodiment, the electronic device 110 may display the execution screen 1010 of the message application as shown in FIG. 10A. For example, the user of Cherry Shrimp of the metaverse service may access the metaverse service. The metaverse server may provide data for representing a virtual space provided by the metaverse service to an external electronic device corresponding to the user of Cherry Shrimp. The external electronic device may represent the virtual space using the received data. The user of Cherry Shrimp may input a command for capturing a specific virtual space and a command for transmitting a message including a capture result to the user of Neo to the external electronic device. The external electronic device may transmit the corresponding commands to the metaverse server. The metaverse server may capture a virtual space associated with the user of Cherry Shrimp, based on the received commands, and may generate a message including the captured result. As described above, the message builder 701 may generate a message using, e.g., a capture function. The generated message may be provided to the message inbox corresponding to Neo, which is transmission information. As described above, the metaverse agent 207 may read the message including the capture result from the message inbox corresponding to Neo. For example, the metaverse agent 207 may provide the corresponding message to the electronic device 110 corresponding to the phone number connected to Neo's SIP account. The corresponding message may be converted into a format corresponding to the message application by, e.g., the message converter 205. Accordingly, the electronic device 110 may display a message 1011 including the capture result.

Figure 10B:
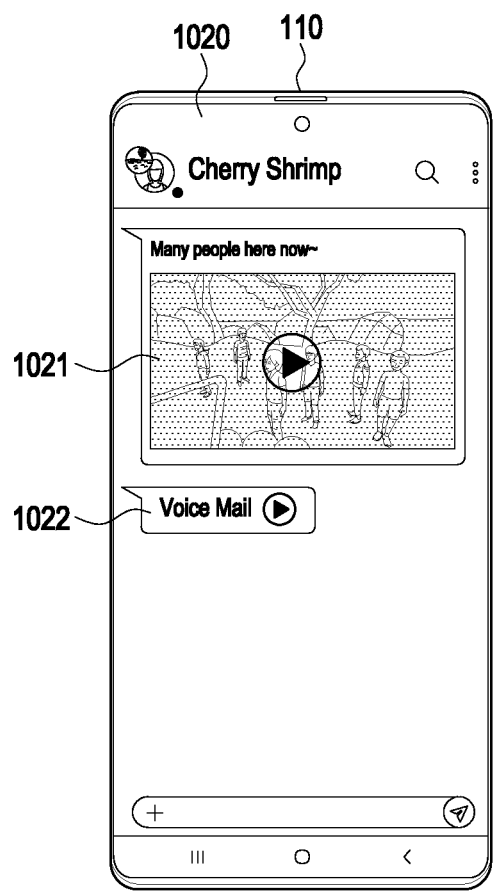
FIG. 10B illustrates an example screen displayed on an electronic device according to an embodiment.

FIG. 10B illustrates an example screen displayed on an electronic device according to an embodiment.

According to an embodiment, the electronic device 110 may display an execution screen 1020 of the message application as shown in FIG. 10B. For example, the user of Cherry Shrimp of the metaverse service may access the metaverse service. The metaverse server may provide data for representing a virtual space provided by the metaverse service to an external electronic device corresponding to the user of Cherry Shrimp. The external electronic device may represent the virtual space using the received data. The user of Cherry Shrimp may input, to the external electronic device, a command for capturing video for a specific period in a specific virtual space and a command for transmitting a message including a result of capturing the moving image to the user of Neo. The external electronic device may transmit the corresponding commands to the metaverse server. The metaverse server may capture the virtual space associated with the user of Cherry Shrimp for a specific period of time, based on the received commands, and may generate a message including the result of capturing. It will be understood by one of ordinary skill in the art that capturing here may refer to storing the activity of the avatar in the virtual space of the metaverse service, for example. As described above, the message builder 701 may generate a message using, e.g., a video capturing function. The generated message may be provided to the message inbox corresponding to Neo, which is transmission information. As described above, the metaverse agent 207 may read a message including the captured result from the message inbox corresponding to Neo. For example, the metaverse agent 207 may provide the corresponding message to the electronic device 110 corresponding to the phone number connected to Neo's SIP account. The corresponding message may be converted into a format corresponding to the message application by, e.g., the message converter 205. Accordingly, the electronic device 110 may display a message 1021 including the captured result. When the play button in the message 1021 is selected, the electronic device 110 may play the corresponding captured result.

Alternatively, the user of Cherry Shrimp may input a command for transmitting a message including a voice recording result to the user of Neo to the external electronic device. The external electronic device may transmit the corresponding command to the metaverse server. The metaverse server may generate a message including the voice recording result, based on the received command. The generated message may be provided to the message inbox corresponding to Neo, which is transmission information. As described above, the metaverse agent 207 may read the message including the voice recording result from the message inbox corresponding to Neo. For example, the metaverse agent 207 may provide the corresponding message to the electronic device 110 corresponding to the phone number connected to Neo's SIP account. The corresponding message may be converted into a format corresponding to the message application by, e.g., the message converter 205. Accordingly, the electronic device 110 may display the message 1022 including the voice recording result. When the play button in the message 1022 is selected, the electronic device 110 may play the corresponding voice recording result.

Figure 10C:
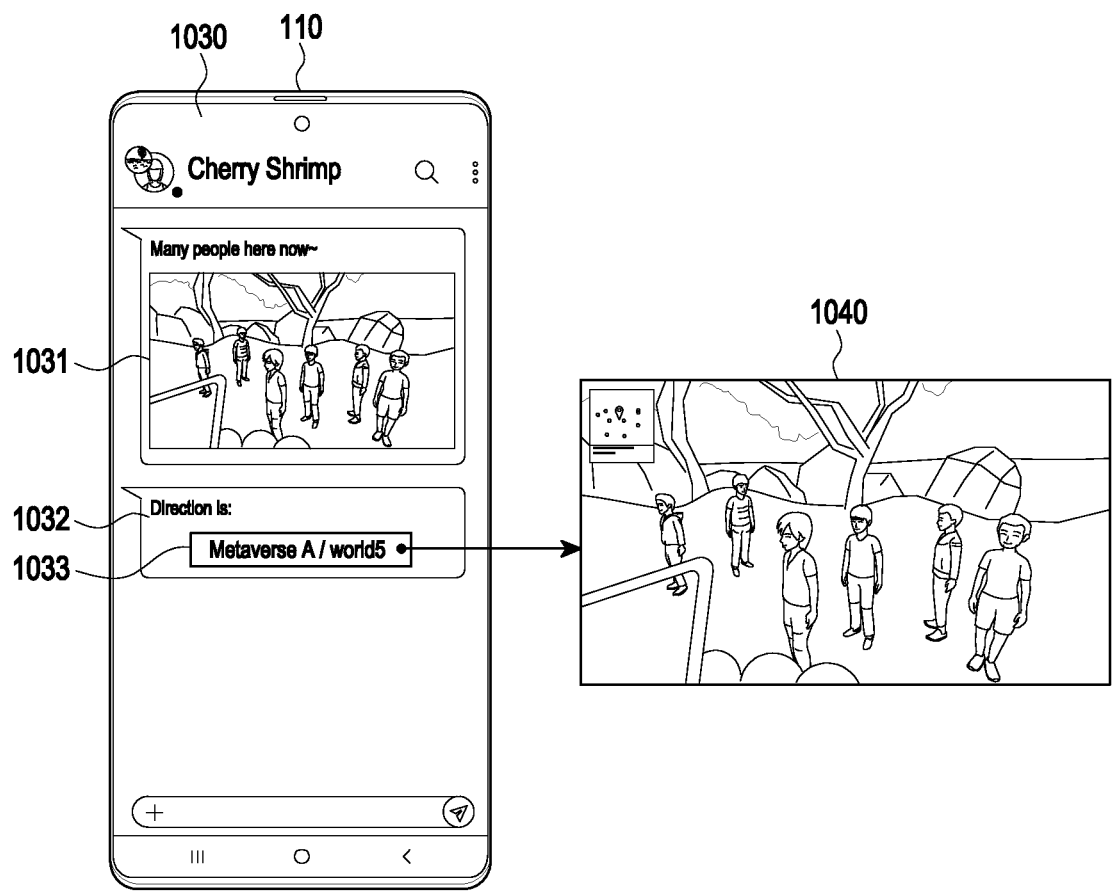
FIGS. 10C and 10D illustrate example screens displayed on an electronic device according to various embodiments.
Figure 10D:
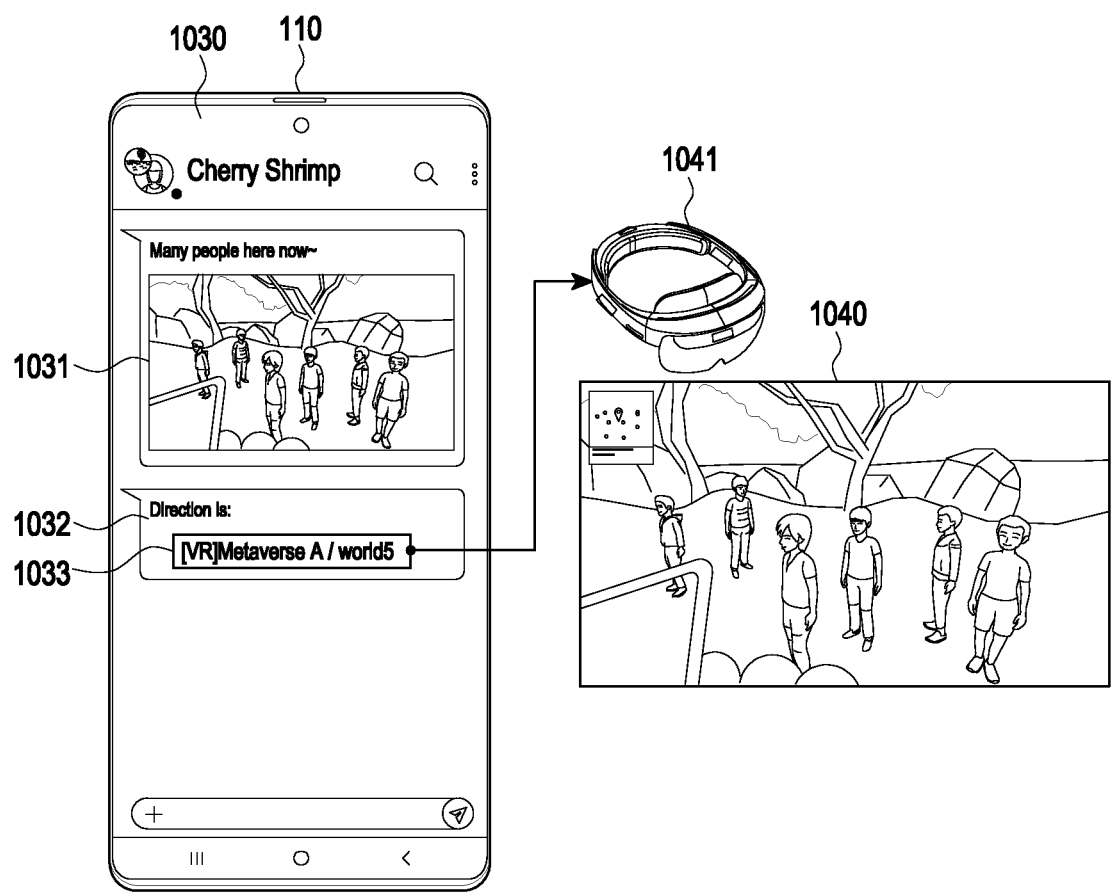

FIGS. 10C and 10D illustrate example screens displayed on an electronic device according to various embodiments.

According to an embodiment, the electronic device 110 may display an execution screen 1030 of the message application as shown in FIG. 10C. The process of displaying the message 1031 including the capture result on the screen 1030 has been described with reference to FIG. 10A, and thus the description is not repeated here. For example, the user of Cherry Shrimp of the metaverse service may access the metaverse service. The metaverse server may provide data for representing a virtual space provided by the metaverse service to an external electronic device corresponding to the user of Cherry Shrimp. The external electronic device may represent the virtual space using the received data. The user of Cherry Shrimp may input a command for transmitting a message causing movement to a specific virtual space to the user of Neo to the external electronic device. The external electronic device may transmit the corresponding command to the metaverse server. The metaverse server may generate a message causing movement to a specific virtual space based on the received command. As described above, the message builder 701 may generate, e.g., a message using a moving function to a specific virtual space. The generated message may be provided to the message inbox corresponding to Neo, which is transmission information. As described above, the metaverse agent 207 may read the message causing movement to the specific virtual space from the message inbox corresponding to Neo. For example, the metaverse agent 207 may provide the corresponding message to the electronic device 110 corresponding to the phone number connected to Neo's SIP account. The corresponding message may be converted into a format corresponding to the message application by, e.g., the message converter 205. Accordingly, the electronic device 110 may display a message 1032 causing movement to a specific virtual space. A movement button 1033 may be included in the message 1032. For example, when the movement button 1033 is selected, the electronic device 110 may execute the metaverse application. The electronic device 110 may execute the metaverse application and display content 1040 representing the specific virtual space. For example, as illustrated in FIG. 10D, an application execution screen 1040 corresponding to a specific virtual space may be displayed on an external electronic device 1041 wiredly or wirelessly connected to the electronic device 110.

Figure 10E:
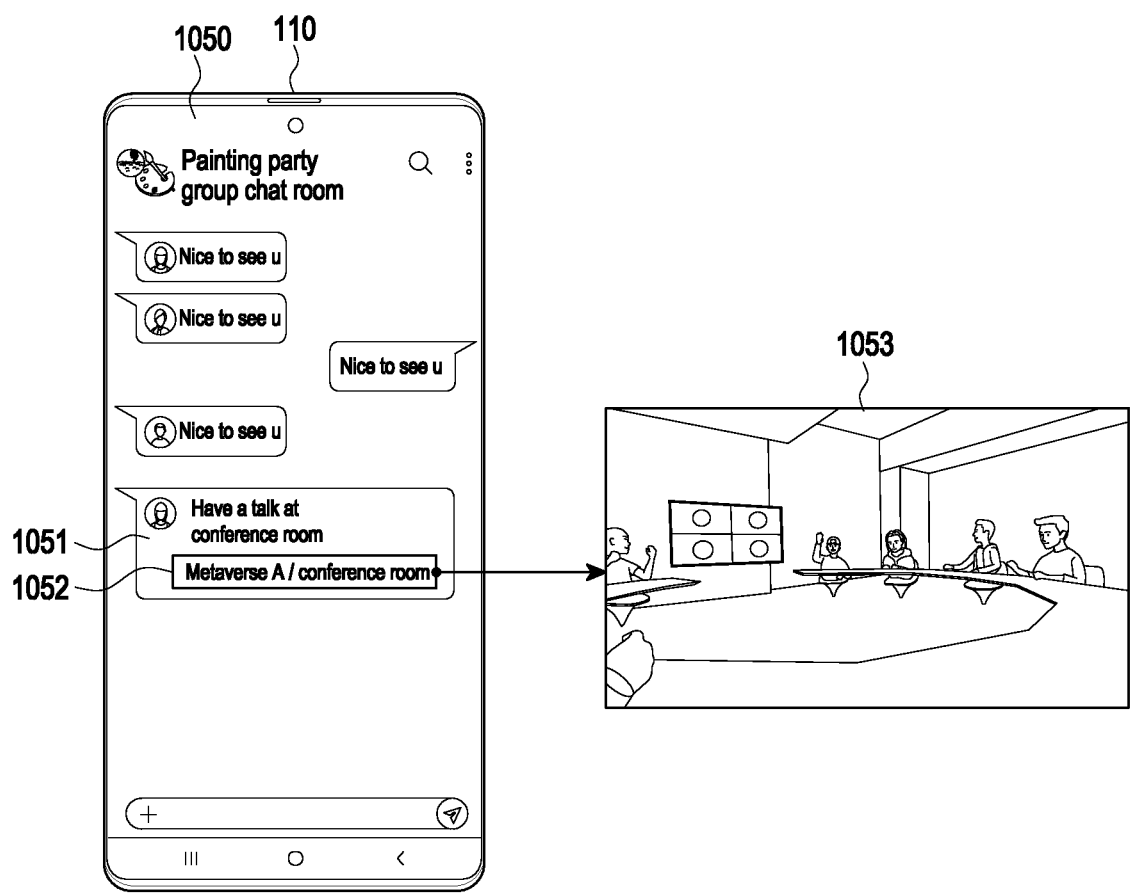
FIG. 10E illustrates an example screen displayed on an electronic device according to an embodiment.

FIG. 10E illustrates an example screen displayed on an electronic device according to an embodiment.

According to an embodiment, the electronic device 110 may display an execution screen 1050 of the message application as shown in FIG. 10E. The screen 1050 may be a screen corresponding to a group chat room in which three or more entities participate. The message server 200 may open a group chat room (or session) in which three or more entities may participate. Each of the three or more entities may be based on, e.g., the phone number or user identification information about the metaverse service. For example, the user who participates in the group chat room may access the metaverse service. The metaverse server is an external electronic device corresponding to the user participating in the group chat room, and may provide data for representing the virtual space provided by the metaverse service. The external electronic device may represent the virtual space using the received data. The user participating in the group chat room may input a command for transmitting a message causing movement to a specific virtual space to entities participating in the group chat room to the external electronic device. The external electronic device may transmit the corresponding command to the metaverse server. The metaverse server may generate a message causing movement to a specific virtual space based on the received command. As described above, the message builder 701 may generate, e.g., a message using a moving function to a specific virtual space. The generated message may be provided to each of message inboxes respectively corresponding to the entities participating in the group chat room. As described above, the metaverse agent 207 may read each of the messages from each of the message inboxes. For example, the metaverse agent 207 may provide a corresponding message to electronic devices respectively corresponding to the entities including the electronic device 110 corresponding to the phone number connected to the SIP account. The corresponding message may be converted into a format corresponding to the message application by, e.g., the message converter 205. Accordingly, the electronic device 110 may display a message 1051 causing movement to a specific virtual space. A movement button 1052 may be included in the message 1051. For example, when the movement button 1052 is selected, the electronic device 110 may execute the metaverse application. The electronic device 110 may execute the metaverse application and display content 1053 representing the specific virtual space.

Figure 11:
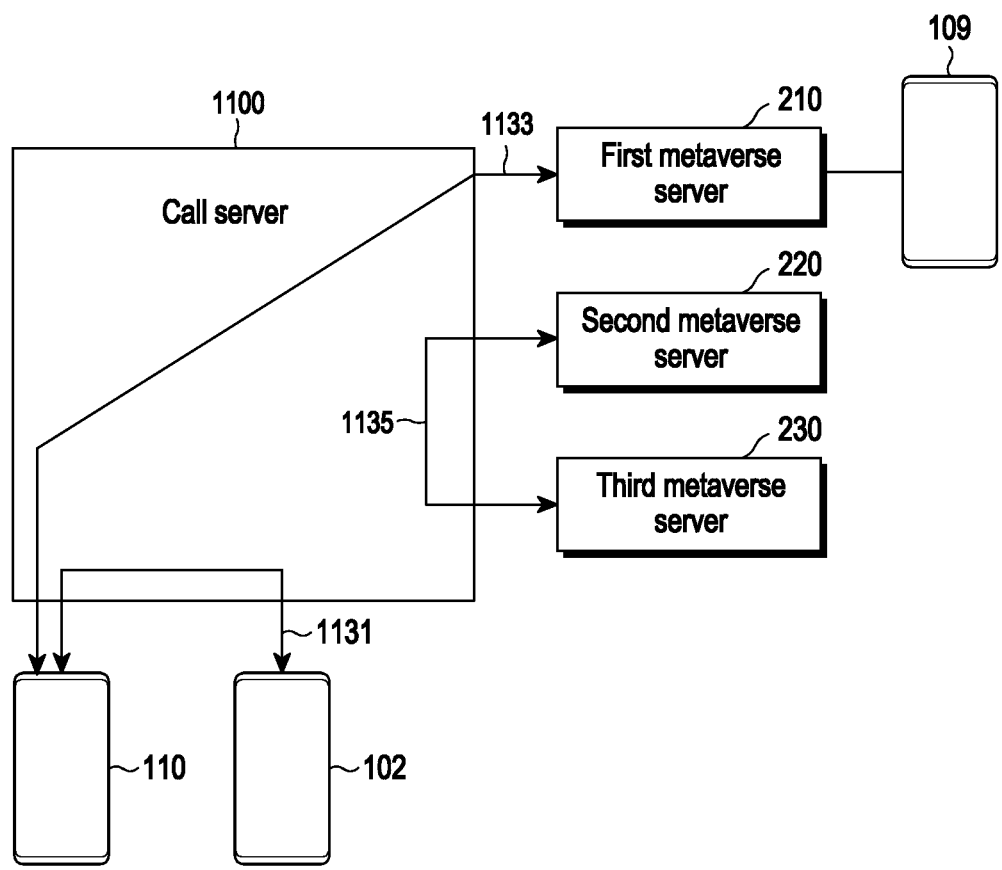
FIG. 11 is a view illustrating an example call between a user in a metaverse and an electronic device according to an embodiment.

FIG. 11 is a view illustrating an example call between a user in a metaverse and an electronic device according to an embodiment.

According to an embodiment, the electronic device 110 may communicate with a call server 1100. The metaverse servers 210, 220, and 230 may communicate with the call server 1100. The call server 1100 may establish and/or manage, e.g., an IMS-based or RCS-based voice call or video call, but the disclosure is not limited to a specific call type and/or base protocol. For example, the call server 1100 may establish a call session between IMS clients, and the IMS clients may transmit and receive media data through the established call session.

In an example embodiment, the electronic device 110 may transmit, e.g., a first message 1131 (e.g., an INVITE message, but not limited thereto) for requesting a call including the first phone number as reception information to the call server 1100. The call server 1100 may transmit the first message 1131 to the electronic device 102 corresponding to the first phone number included in the first message 1131. The electronic device 102 may transmit a response message (e.g., 200 OK message, but not limited thereto) corresponding to the first message 1131 to the call server 1100. The call server 1100 may transmit a response message to the electronic device 110, and accordingly, a call session may be established with the electronic device 110 as the sender and the electronic device 102 as the receiver. Meanwhile, the electronic device 102 may transmit a second message including a second phone number to the call server 1100, and the call server 1100 may transmit the second message to the electronic device 110 corresponding to the second phone number. As described above, a call session having the electronic device 110 as the receiver and the electronic device 102 as the sender may be established.

In an example embodiment, the electronic device 110 may transmit, e.g., a second message 1133 including identification information about the first metaverse service (or the first metaverse server 210) and first user identification information in the first metaverse service as reception information to the call server 1100. For example, the first metaverse service identification information may be represented as a domain name such as "A.com", but is not limited thereto. The first user identification information (e.g., Neo) may be, e.g., identification information defined in the first metaverse service (e.g., newly generated in the first metaverse service), and may be unique in the first metaverse service, although not limited in format. Accordingly, the reception information (e.g., Neo@A.com) including the identification information about the first metaverse service and the first user identification information may be unique in the message server 200.

According to an embodiment, the call server 1100 may transmit the second message 1133 to the first metaverse server 210 corresponding to the reception information included in the second message 1133. For example, the call server 1100 may convert the sender (e.g., the "from" field of the INVITE) of the second message 1133 from the phone number to the SIP account corresponding to the phone number defined in the first metaverse service, but this is by way of example and the call server 1100 may maintain the phone number. For example, the first metaverse server 210 may execute an IMS client corresponding to the first user identification information, and the IMS client may process the received second message 1133 based on the IMS protocol.

For example, the first metaverse server 210 may transmit data indicating that a call is requested to the electronic device 109 corresponding to the first user identification information, based on the second message 1133. If the sender (e.g., "from" field of INVITE) of the second message 1133 is changed from the phone number to the user identification information (e.g., Neo), the electronic device 109 may indicate that a call is requested from Neo. If a call response command is input to the electronic device 109, the electronic device 109 may transmit the call response command to the first metaverse server 210. The first metaverse server 210 may transmit a response message (e.g., a 200 OK message, but not limited thereto) to the call server 1100. The call server 1100 may transmit a response message to the electronic device 110. Accordingly, a call session between the electronic device 110 and the first metaverse server 210 (e.g., an IMS client) may be established. The electronic device 110 may transmit and receive media data to and from the first metaverse server 210. The first metaverse server 210 may relay the corresponding media data to the electronic device 109, and accordingly, the electronic device 110 and the electronic device 109 may perform a substantial call.

In an example embodiment, it is also possible to perform a call between the metaverse servers 220 and 230. The second metaverse server 220 (e.g., IMS client) may transmit a third message 1135 for call generation to the third metaverse server 230 (e.g., IMS client). For example, the third message 1135 may include the third metaverse service (or the third metaverse server 230) and third user identification information as reception information. For example, the second metaverse server 220 may receive a message transmission request for the third metaverse service (or the third metaverse server 230) and third user identification information from an electronic device (not shown) that has logged in using the second user identification information. The second metaverse server 220 may transmit the third message 1135 including the third metaverse service (or the third metaverse server 230) and the third user identification information as reception information to the third metaverse server 230 based on the message transmission request. The third metaverse server 230 may receive the third message 1135. The third metaverse server 230 may transmit data indicating that a call is requested to the electronic device corresponding to the third user identification information, based on the third message 1135. If "Trinity" is included in the sender (e.g., "from" field of INVITE) of the third message 1135, the electronic device may represent that a call is requested from Trinity. If a call response command is input to the electronic device, the electronic device may transmit the call response command to the third metaverse server 230. The third metaverse server 230 may transmit a response message (e.g., a 200 OK message, but not limited thereto) to the call server 1100. The call server 1100 may transmit the response message to the second metaverse server 220. Accordingly, a call session between the second metaverse server 220 and the third metaverse server 230 may be established. The second metaverse server 220 and the third metaverse server 230 may transmit and receive media data based on the established call session, and accordingly, a substantial call between the electronic device corresponding to the second metaverse server 220 and the third metaverse server 230 may be performed. Accordingly, a call between the heterogeneous metaverse servers 220 and 230 may be performed.

Figure 12:
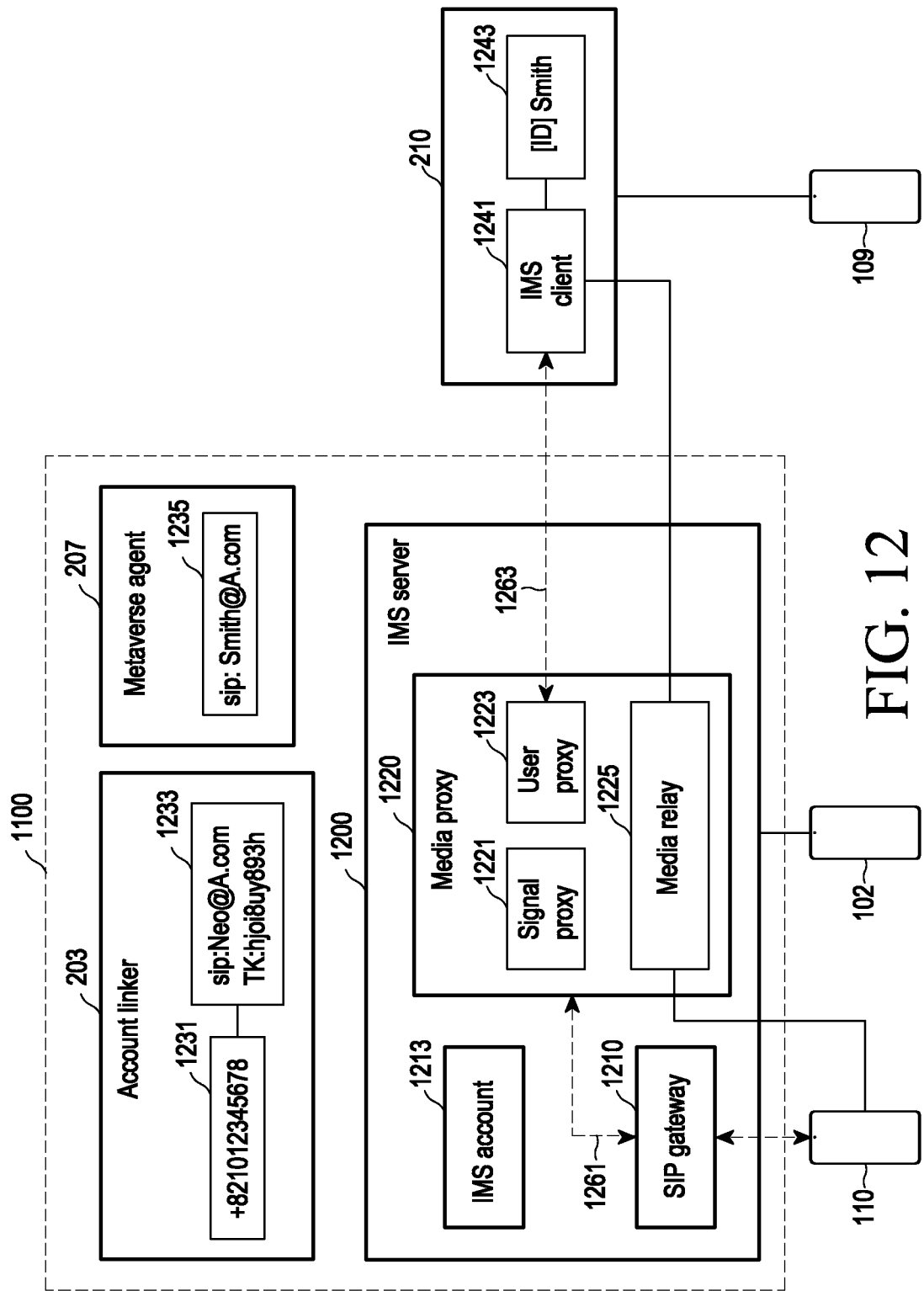
FIG. 12 is a view illustrating example operations of an electronic device, a message server, and a metaverse server according to an embodiment.

FIG. 12 is a view illustrating example operations of an electronic device, a message server, and a metaverse server according to an embodiment.

According to an embodiment, the call server 1100 may include an account linker 203, a metaverse agent 207, and/or an IMS server 1200, but this is by way of example without limitation, and at least one entity may be implemented independently from the call server 1100. As described above, the account linker 203 may store and/or manage the phone number 1231 (e.g., +821012345678) and its associated SIP account and token 1233 (e.g., sip: Neo@A.com, TK: hjoi8uy893h).

According to an embodiment, the IMS server 1200 may include an SIP gateway 1210. The electronic device 110 may transmit an INVITE message 1261 to the SIP gateway 1210. The "from" field of the INVITE message 1261 may include the phone number+821012345678 as transmission information, and the "to" field may include the SIP account of "Smith@A.com" as transmission information. The SIP gateway 1210 may transmit the INVITE message 1261 to a media proxy 1220. The signal proxy 1221 of the media proxy 1220 may refer to the account linker 203, and accordingly, in the "from" field, it may be identified that the SIP account corresponding to the phone number of +821012345678 is "Neo@A.com". For example, the signal proxy 1221 may convert the transmission information about +821012345678 into the SIP account of Neo@A.com. Accordingly, the "from" field may include the SIP account of "Neo@A.com", and the "to" field may provide the INVITE message including the SIP account of "Smith@A.com". Meanwhile, depending on implementation, transmission information about +821012345678 may be maintained. The user agent 1223 may transmit the INVITE message to the IMS client 1241 corresponding to "Smith" of the first metaverse server 210, based on the SIP account of "Smith@A.com" in the "to" field of the INVITE message. The user agent 1223 may negotiate the media format with the IMS client of the metaverse service.

For example, the signal proxy 1221 may receive, from the metaverse agent 207, whether the SIP account 1235 "sip: Smith@A.com" is logged in. For example, the signal proxy 1221 may control to transmit an INVITE message to the IMS client 1241 based on the logged-in state of the "sip: Smith@A.com" SIP account 1235. The IMS client 1241 may identify that a call is requested from "Neo" to "Smith" based on the SIP account of "Neo@A.com" being included in the "from" field of the INVITE message. The first metaverse server 210 may provide, e.g., data for representing that a call is requested from "Neo" to "Smith" to the electronic device 109 corresponding to "Smith". The electronic device 109 may represent that a call is requested from "Neo" to "Smith" using the received data. If the call response command is identified, the electronic device 109 may transmit the call response command to the first metaverse server 210. The IMS client 1241 of the first metaverse server 210 may transmit a 200 OK message 1263 to the IMS server 1200. The IMS server 1200 may transmit a 200 OK message to the electronic device 110. Accordingly, a call session between the electronic device 110 and the first metaverse server 210 (e.g., the IMS client 1241) may be established. The electronic device 110 and the first metaverse server 210 (e.g., the IMS client 1241) may transmit and receive media data through the established call session. For example, the media relay 1225 may relay media data between the electronic device 110 and the first metaverse server 210 (e.g., the IMS client 1241). According to an embodiment, the signal proxy 1221 may identify that the "sip:Smith@A.com" SIP account 1235 is logged out based on information received from the metaverse agent 1235. The signal proxy 1221 may identify the phone number (e.g., +821876543210) corresponding to the SIP account 1235 "sip: Smith@A.com" with reference to the account linker 203. The signal proxy 1221 may transmit an INVITE message to the electronic device 102 corresponding to the identified phone number. For example, the SIP account in the "to" field of the INVITE message may be converted into a phone number. The electronic device 102 registered corresponding to Smith's account may receive an INVITE message for requesting a call accordingly. When the call response command is obtained, the electronic device 102 may transmit a 200 OK message to the IMS server 1200. The IMS server 1200 may transmit a 200 OK message to the electronic device 110. Accordingly, a call session may be established between the electronic device 110 and the electronic device 102 while the SIP account 1235 "sip:Smith@A.com" is logged out.

Figure 13A:
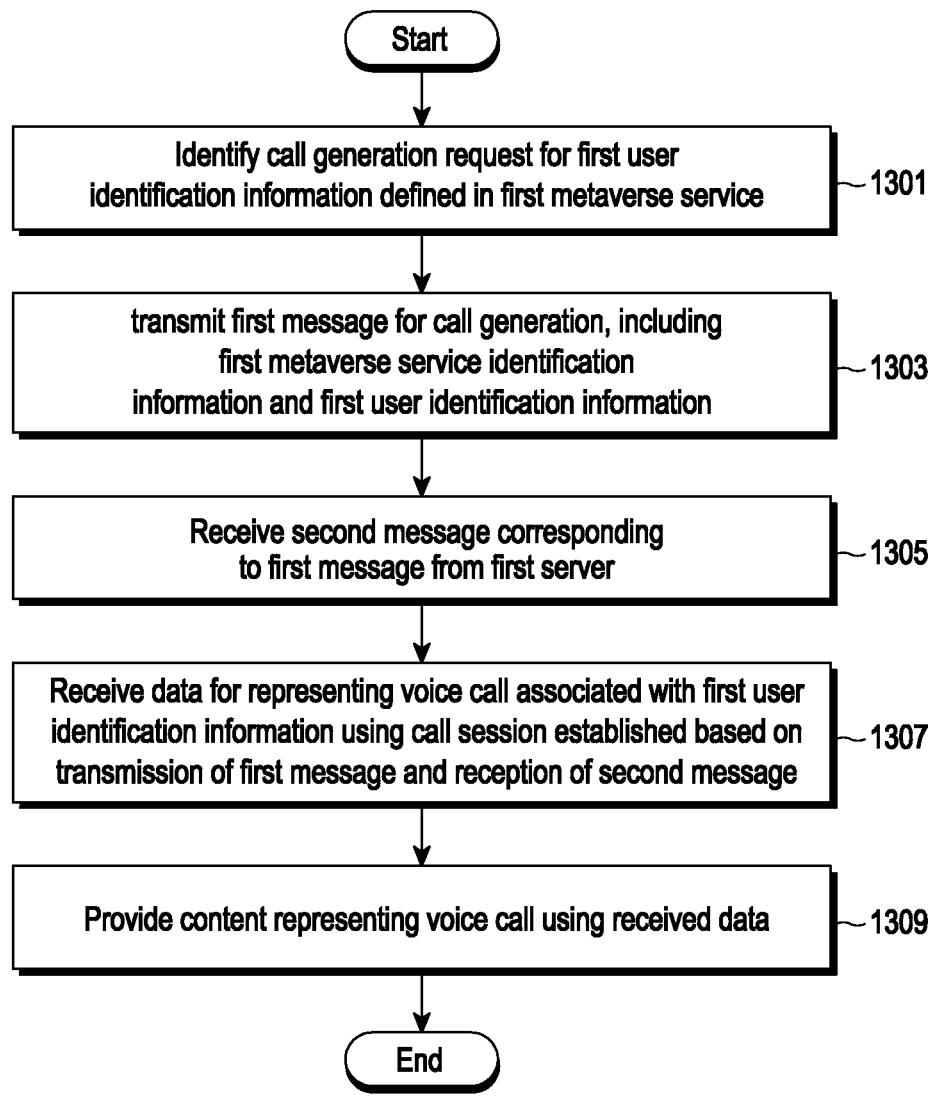
FIG. 13A is a flowchart illustrating an example operation method of an electronic device according to an embodiment.
Figure 13B:
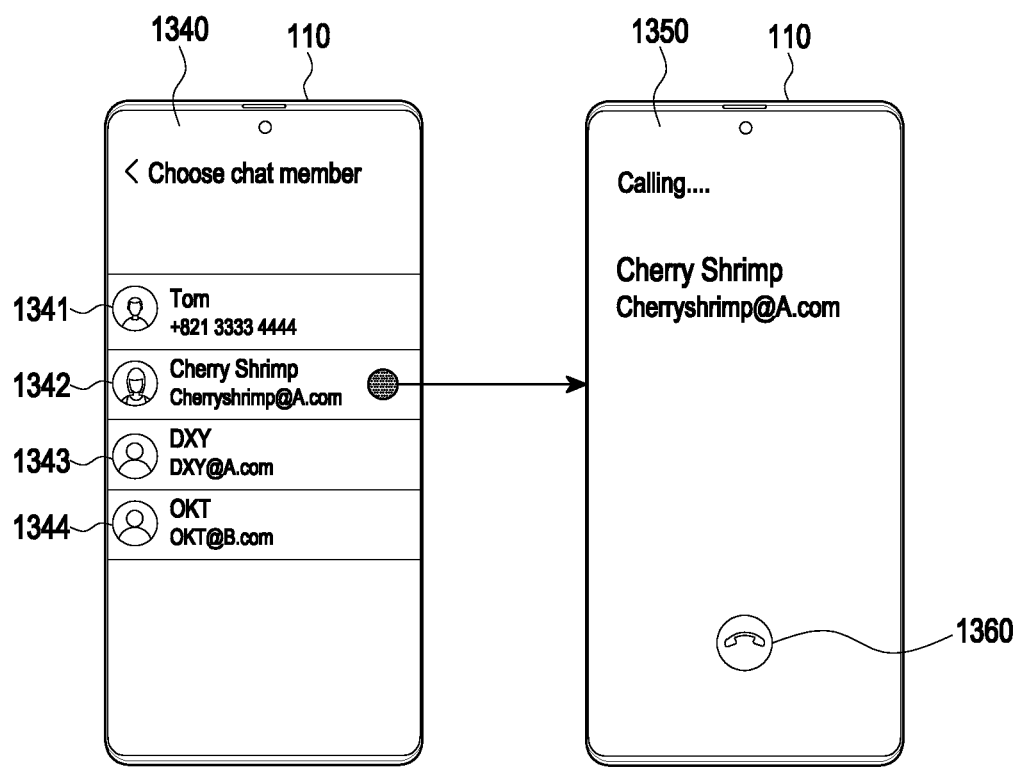
FIG. 13B is a view illustrating example execution screens of a call application according to an embodiment.

FIG. 13A is a flowchart illustrating an example operation method of an electronic device according to an embodiment. The embodiment of FIG. 13A is described with reference to FIG. 13B. FIG. 13B is a view illustrating example execution screens of a call application according to an embodiment.

Referring to FIGS. 13A and 13B together, according to an embodiment, in operation 1301, the electronic device 110 (e.g., the processor 111) may identify a call generation request for the first user identification information defined in the first metaverse service. In operation 1303, the electronic device 110 may transmit a first message for call generation, including identification information about the first metaverse service and first user identification information. For example, the electronic device 110 may identify the call generation request for the first user identification information through the execution screen 1340 of the call application as illustrated in FIG. 13B. The execution screen 1340 of the call application may include at least one tab 1341, 1342, 1343, and 1344 respectively corresponding to at least one contact. For example, the call application (or contact application) may store the phone number "+82133334444" for the name "Tom" as contact information, the SIP account of "Cherryshrimp@A.com" for the name "Cherry Shrimp" as contact information, the SIP account of "DXY@A.com" for the name "DXY" as contact information, and the SIP account of "OKT@B.com" for the name "OKT" as contact information. The call application (or contact application) may manage the SIP account including identification information about the metaverse service and user identification information, as well as the phone number based on the existing message transmission and reception protocol, as contact information. For example, based on designation of the tab 1342 corresponding to "Cherry Shrimp" (or designation of an additional call button) on the application execution screen 1340, the electronic device 110 may display the screen 1350 for displaying a call connection to the contact of "Cherry Shrimp". The screen 1350 may include text indicating that a call is being connected to the contact of "Cherry Shrimp" and a call end button 1360, but the objects included in screen 1350 are not limited thereto. For example, the electronic device 110 may transmit an INVITE message in which the SIP account of "Cherryshrimp@A.com" is included in the "to" field. The "from" field of the INVITE message may include the phone number corresponding to the electronic device 110.

According to an embodiment, in operation 1305, the electronic device 110 may receive a second message (e.g., a 200 OK message) corresponding to the first message from a first server (e.g., the first metaverse server 210) (or an IMS client), e.g., through the IMS server 1200. Operations performed until the 200 OK message is received have been described with reference to FIG. 12, and thus a detailed description thereof is not repeated. In operation 1307, the electronic device 110 may receive data for representing a voice call associated with the first user identification information using a call session established based on the transmission of the first message and the reception of the second message. In operation 1309, the electronic device 110 may provide content representing a voice call using the received data. Accordingly, a voice call may be performed with the electronic device 110 and a metaverse server (or an IMS server), but this is by way of example without limitation, and it will be understood by those skilled in the art that a video call may also be performed.

According to an example embodiment, an electronic device 110 may include at least one processor 111 and a communication device 117 (including, e.g., a communication circuit). The at least one processor 111 may be configured to display an execution screen of a message application capable of accessing first reception information about a first receiver and second reception information about a second receiver. The at least one processor 111 may be configured to obtain a first command for transmitting a first message corresponding to the first receiver through the execution screen of the message application; transmit, through the communication device 117, the first message including a first phone number as reception information, based on the first reception information about the first receiver being the first phone number corresponding to the first receiver, in response to obtaining the first command; obtain a second command for transmitting a second message corresponding to the second receiver through the execution screen of the message application; and transmit, through the communication device 117, the second message including identification information about a metaverse service and user identification information as the reception information, based on the second reception information about the second receiver being the identification information about the metaverse service and the user identification information defined in the metaverse service, in response to obtaining the second command.

According to an example embodiment, the first message and the second message may include a second phone number corresponding to the electronic device 110 as transmission information.

According to an example embodiment, the execution screen of the message application may include a first object indicating that the second receiver is associated with the metaverse service.

According to an example embodiment, the at least one processor 111 may be further configured to receive, through the communication device 117, information about whether the second receiver logs in to the metaverse service.

According to an example embodiment, the at least one processor 111 may be configured to, as at least part of displaying the execution screen of the message application, display an indicator indicating whether the second receiver logs in to the metaverse service, identified based on the received information.

According to an example embodiment, the at least one processor 111 may be further configured to receive a third message from the second receiver through the communication device 117; and display the third message, with the second message, on a message transmission and reception screen associated with the second receiver.

According to an example embodiment, the third message may include a function button to trigger a movement to a first virtual space defined in the metaverse service and the at least one processor 111 may be further configured to execute an application for the metaverse service based on identifying selection of the function button; and provide an execution screen of the application associated with the first virtual space defined in the metaverse service.

According to an example embodiment, the third message may include a thumbnail of an image associated with a first virtual space defined in the metaverse service and the at least one processor 111 may be further configured to display an image corresponding to the thumbnail based on identifying selection of the thumbnail.

According to an example embodiment, the third message may include a thumbnail of a video associated with a first virtual space defined in the metaverse service and the at least one processor 111 may be further configured to play a video corresponding to the thumbnail based on identifying selection of the thumbnail.

According to an example embodiment, the method for operating the electronic device 110 may include displaying an execution screen of a message application capable of accessing first reception information about a first receiver and second reception information about a second receiver; obtaining a first command for transmitting a first message corresponding to the first receiver through the execution screen of the message application; transmitting the first message including a first phone number as reception information, based on the first reception information about the first receiver being the first phone number corresponding to the first receiver, in response to obtaining the first command; obtaining a second command for transmitting a second message corresponding to the second receiver through the execution screen of the message application; and transmitting the second message including identification information about a metaverse service and user identification information as the reception information, based on the second reception information about the second receiver being the identification information about the metaverse service and the user identification information defined in the metaverse service, in response to obtaining the second command.

According to an example embodiment, the first message and the second message may include a second phone number corresponding to the electronic device 110 as transmission information.

According to an example embodiment, the execution screen of the message application may include a first object indicating that the second receiver is associated with the metaverse service.

According to an example embodiment, the method for operating the electronic device 110 may further include receiving information about whether the second receiver logs in to the metaverse service.

According to an example embodiment, displaying the execution screen of the message application may display an indicator indicating whether the second receiver logs in to the metaverse service, identified based on the received information.

According to an example embodiment, the method for operating the electronic device 110 may further include receiving a third message from the second receiver; and displaying the third message, with the second message, on a message transmission and reception screen associated with the second receiver.

According to an example embodiment, the third message may include a function button to trigger a movement to a first virtual space defined in the metaverse service and the method for operating the electronic device 110 may further include executing an application for the metaverse service based on identifying selection of the function button; and providing an execution screen of the application associated with the first virtual space defined in the metaverse service.

According to an example embodiment, the third message may include a thumbnail of an image associated with a first virtual space defined in the metaverse service and the may further include displaying an image corresponding to the thumbnail based on identifying selection of the thumbnail.

According to an example embodiment, the third message may include a thumbnail of a video associated with a first virtual space defined in the metaverse service and the method for operating the electronic device 110 may further include playing a video corresponding to the thumbnail based on identifying selection of the thumbnail.

According to an example embodiment, a non-transitory storage medium may store instructions that, when executed by at least one processor 111, enable an electronic device 110 to perform at least one operation including obtaining a first command for transmitting a first message corresponding to the first receiver through the execution screen of the message application; transmitting the first message including a first phone number as reception information, based on the first reception information about the first receiver being the first phone number corresponding to the first receiver, in response to obtaining the first command; obtaining a second command for transmitting a second message corresponding to the second receiver through the execution screen of the message application; and transmitting the second message including identification information about a metaverse service and user identification information as the reception information, based on the second reception information about the second receiver being the identification information about the metaverse service and the user identification information defined in the metaverse service, in response to obtaining the second command.

According to an example embodiment, an electronic device 110 may include at least one processor 111 and a communication device 117. The at least one processor 111 may be configured to identify a call generation request for first user identification information defined in a first metaverse service; transmit, through the communication device 117, a first message for call generation, including identification information about the first metaverse service and the first user identification information; receive, through the communication device 117, a second message corresponding to the first message from a first server corresponding to the first metaverse service; receive, through the communication device 117, data for representing a voice call associated with the first user identification information using a call session established based on transmission of the first message and reception of the second message; and provide content representing the voice call using the received data.

According to an example embodiment, a method for operating an electronic device 110 may include identifying a call generation request for first user identification information defined in a first metaverse service; transmitting a first message for call generation, including identification information about the first metaverse service and the first user identification information; receiving a second message corresponding to the first message from a first server corresponding to the first metaverse service; receiving data for representing a voice call associated with the first user identification information using a call session established based on transmission of the first message and reception of the second message; and providing content representing the voice call using the received data.

According to an example embodiment, a non-transitory storage medium may store instructions that, when executed by at least one processor 111, enable an electronic device 110 to perform at least one operation including identifying a call generation request for first user identification information defined in a first metaverse service; transmitting a first message for call generation, including identification information about the first metaverse service and the first user identification information; receiving a second message corresponding to the first message from a first server corresponding to the first metaverse service; receiving data for representing a voice call associated with the first user identification information using a call session established based on transmission of the first message and reception of the second message; and providing content representing the voice call using the received data.

According to an example embodiment, the first message may be an SIP-based INVITE message; a "from" field of the INVITE message may include a phone number corresponding to the electronic device 110; and a "to" field of the INVITE message may include the identification information about the first metaverse service and the first user identification information.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 110). For example, a processor (e.g., the processor 111) of the machine (e.g., the electronic device 110) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or further, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   at least one processor comprising processing circuitry;
   memory storing instructions; and
   a communication device comprising communication circuitry,
   wherein the instructions, when executed by at least one processor individually or collectively, cause the electronic device to:

display an execution screen of a message application capable of accessing first reception information about a first receiver and second reception information about a second receiver, obtain, through the execution screen of the message application, a first command for transmitting a first message corresponding to the first receiver, transmit, through the communication device, the first message including, as reception information, a first phone number, based on the first reception information about the first receiver being the first phone number corresponding to the first receiver, in response to obtaining the first command, obtain, through the execution screen of the message application, a second command for transmitting a second message corresponding to the second receiver, transmit, through the communication device, the second message including, as reception information, metaverse service identification information identifying a metaverse service defining a virtual space and user identification information identifying a user of the metaverse service, based on the second reception information about the second receiver being the metaverse service identification information identifying the metaverse service and the user identification information identifying the user of the metaverse service, in response to obtaining the second command.

2. The electronic device of claim 1, wherein the first message and the second message include, as transmission information, a second phone number corresponding to the electronic device.

3. The electronic device of claim 1, wherein the execution screen of the message application includes a first object indicating that the second receiver is associated with the metaverse service.

4. The electronic device of claim 1, wherein the instructions cause the electronic device to receive, through the communication device, information about whether the second receiver logs in to the metaverse service.

5. The electronic device of claim 4, wherein the instructions cause the electronic device to,
display an indicator indicating whether the second receiver logs in to the metaverse service, identified based on the received information.

6. The electronic device of claim 1, wherein the instructions cause the electronic device to:
receive, through the communication device, a third message from the second receiver; and
display the third message, with the second message, on a message transmission and reception screen.

7. The electronic device of claim 6, wherein the third message includes a function button selectable to access the virtual space, and
wherein the instructions cause the electronic device to:
execute an application for the metaverse service, and
provide an execution screen of the application associated with the virtual space.

8. The electronic device of claim 6, wherein the third message includes a thumbnail of an image associated with the virtual space, and
wherein the instructions cause the electronic device to display an image corresponding to the thumbnail based on identifying selection of the thumbnail.

9. The electronic device of claim 6, wherein the third message includes a thumbnail of a video associated with the virtual space, and
wherein the instructions cause the electronic device to play a video corresponding to the thumbnail based on identifying selection of the thumbnail.

10. The electronic device of claim 1, wherein the instructions cause the electronic device to:
display a message transmission and reception screen comprising messages communicated between the electronic device and the second receiver and an object selectable to access the virtual space.

11. The electronic device of claim 1, wherein the instructions cause the electronic device to:
receive, through the communication device, a third message from the second receiver,
display the third message on the execution screen of the message application, and
based on identifying a user input on at least part of the third message, display an execution screen for the metaverse service associated with the virtual space.

12. A method for operating an electronic device, the method comprising:
displaying an execution screen of a message application capable of accessing first reception information about a first receiver and second reception information about a second receiver;
obtaining, through the execution screen of the message application, a first command for transmitting a first message corresponding to the first receiver;
transmitting the first message including, as reception information, a first phone number, based on the first reception information about the first receiver being the first phone number corresponding to the first receiver, in response to obtaining the first command;
obtaining, through the execution screen of the message application, a second command for transmitting a second message corresponding to the second receiver; and
transmitting the second message including, as reception information, metaverse service identification information identifying a metaverse service defining a virtual space and user identification information identifying a user of the metaverse service, based on the second reception information about the second receiver being the metaverse service identification information identifying the metaverse service and the user identification information identifying the user of the metaverse service, in response to obtaining the second command.

13. The method of claim 12, wherein the first message and the second message include, as transmission information, a second phone number corresponding to the electronic device.

14. The method of claim 12, wherein the execution screen of the message application includes a first object indicating that the second receiver is associated with the metaverse service.

15. The method of claim 12, further comprising,
receiving information about whether the second receiver logs in to the metaverse service.

16. The method of claim 15, wherein displaying the execution screen of the message application displays an indicator indicating whether the second receiver logs in to the metaverse service, identified based on the received information.

17. The method of claim 12, further comprising:
receiving a third message from the second receiver; and displaying the third message, with the second message, on a message transmission and reception screen.

18. The method of claim 17, wherein the third message includes a function button selectable to access the virtual space, and
wherein the method further comprises, based on identifying selection of the function button:
executing an application for the metaverse service; and
providing an execution screen of the application associated with the virtual space.

19. The method of claim 17, wherein the third message includes a thumbnail of an image associated with the virtual space, and
wherein the method further comprises displaying an image corresponding to the thumbnail based on identifying selection of the thumbnail.

20. The method of claim 17, wherein the third message includes a thumbnail of a video associated with the virtual space, and
wherein the method further comprises playing a video corresponding to the thumbnail based on identifying selection of the thumbnail.

21. An electronic device comprising:
at least one processor comprising processing circuitry;
memory storing instructions; and
a communication device comprising communication circuitry,
wherein the instructions, when executed by at least one processor individually or collectively, cause the electronic device to:
identify a call generation request for user identification information identifying a user of a metaverse service defining a virtual space,
transmit, through the communication device, a first message for call generation, including metaverse service identification information identifying the metaverse service and the user identification information,
receive, through the communication device, a second message corresponding to the first message from a server corresponding to the metaverse service,
receive, through the communication device, data representing a voice call associated with the user identification information using a call session established based on transmission of the first message and reception of the second message, and
display a screen comprising content representing the voice call using the received data and an object selectable to access the virtual space.

22. The electronic device of claim 21, wherein the first message is an SIP-based INVITE message, and
wherein a "from" field of the INVITE message includes a phone number corresponding to the electronic device, and a "to" field of the INVITE message includes the metaverse service identification information about the metaverse service and the user identification information.

* * * * *